(12) United States Patent
Yamashita et al.

(10) Patent No.: US 7,669,578 B2
(45) Date of Patent: Mar. 2, 2010

(54) METHOD OF OPERATING AN INTERNAL COMBUSTION ENGINE

(75) Inventors: Hiroyuki Yamashita, Hiroshima (JP); Tatsuya Tanaka, Higashi-hiroshima (JP); Tomomi Watanabe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 12/013,360

(22) Filed: Jan. 11, 2008

(65) Prior Publication Data

US 2008/0178836 A1 Jul. 31, 2008

(30) Foreign Application Priority Data

Jan. 30, 2007 (JP) ............... 2007-018981
Jan. 30, 2007 (JP) ............... 2007-018999

(51) Int. Cl.
*F02B 17/00* (2006.01)
*F02B 3/00* (2006.01)

(52) U.S. Cl. ..................... 123/295; 123/299

(58) Field of Classification Search ................. 123/295, 123/299, 300, 429, 430, 431
See application file for complete search history.

(56) References Cited

U.S. PATENT DOCUMENTS

| | | | | |
|---|---|---|---|---|
| 3,976,038 | A * | 8/1976 | Stahl ........................ | 123/257 |
| 6,293,246 | B1 * | 9/2001 | Tanahashi et al. .......... | 123/305 |
| 6,336,436 | B1 * | 1/2002 | Miyakubo et al. .......... | 123/295 |
| 6,425,367 | B1 | 7/2002 | Hiraya et al. | |
| 6,644,019 | B2 * | 11/2003 | Morikawa et al. ............. | 60/285 |
| 7,234,438 | B2 | 6/2007 | Yang | |
| 2004/0194746 | A1 * | 10/2004 | Yamaoka et al. ......... | 123/90.15 |
| 2005/0022755 | A1 * | 2/2005 | Hitomi et al. .............. | 123/58.8 |
| 2005/0155344 | A1 * | 7/2005 | Kobayashi .................... | 60/286 |
| 2006/0016423 | A1 * | 1/2006 | Kuo et al. .................... | 123/299 |
| 2006/0174853 | A1 * | 8/2006 | Koopmans .................. | 123/295 |

FOREIGN PATENT DOCUMENTS

| | | |
|---|---|---|
| EP | 1052391 | 11/2000 |
| EP | 1085192 | 3/2001 |
| EP | 1164276 | 12/2001 |
| EP | 1681452 | 7/2006 |
| WO | 2004/029428 | 4/2004 |

* cited by examiner

*Primary Examiner*—Stephen K Cronin
*Assistant Examiner*—David Hamaoui
(74) *Attorney, Agent, or Firm*—Alleman Hall McCoy Russell & Tuttle LLP

(57) ABSTRACT

A method of operating an internal combustion engine having a combustion chamber with a piston and a spark plug, comprising during a first mode, bringing the temperature of the combustion chamber to auto-ignition temperature by adjusting engine operating conditions and producing auto-ignition in said combustion chamber without requiring spark from said spark plug; and during a second mode, bringing the temperature of the combustion chamber close to auto-ignition temperature by adjusting engine operating conditions, forming a small cloud of stratified air-fuel mixture near said spark plug, igniting said fuel cloud by a spark form said spark plug, and then causing cylinder pressure to rise, thereby producing auto-ignition at other sites in said combustion chamber wherein said first mode is implemented in a first operating range and said second mode is implemented only in a second operating range where engine speed and load are lower than said first operating range.

17 Claims, 15 Drawing Sheets

METHOD OF OPERATING AN INTERNAL COMBUSTION ENGINE

FIELD

The present description relates to a gasoline engine which combusts a compressed premixed air-fuel mixture by auto-ignition. More particularly, the description pertains to a method or system for operating an internal combustion engine having a combustion chamber with a piston and a spark plug which can perform homogeneous charge compression ignition (HCCI) combustion.

BACKGROUND AND SUMMARY

In recent years, a new type of gasoline combustion has been demonstrated. In particular, a pre-mixed air-fuel mixture is compressed in a combustion chamber such that the mixture combusts without using a spark plug to initiate the combustion. This type of combustion has been developed to improve fuel economy and emissions of gasoline engines. HCCI combustion may result in higher thermal efficiency as compared to common spark ignition (SI) combustion. This is because HCCI combustion is initiated at a plurality of sites in the combustion chamber. Combustion starts by auto-ignition and occurs simultaneously at a number of sites in the cylinder rather than at a single source. This sequence is different from the SI combustion which begins at the spark plug and then propagates to the combustion chamber periphery as the flame front progresses. Further, HCCI combustion may also increase the cylinder mixture temperature when the pre-mixture is lean or when the pre-mixture is diluted by EGR. The cylinder mixture can be heated such that auto-ignition is more likely to occur when the cylinder is compressed. If the cylinder mixture is not pre-heated before compression at lower engine speeds and load, auto-ignition is less likely to occur. HCCI combustion also reduces NOx formation in the cylinder because the peak cylinder pressure is reduced. However, as mentioned above, when the engine is operating at lower speeds and lower loads, the pre-mixed air-fuel temperature may not increase to auto-ignition temperature even when the piston reaches the top-dead-center position.

One example of a method of operating a gasoline engine using HCCI combustion is described by U.S. Pat. No. 6,425,367. The method describes auto-ignition of a mixture that is facilitated by providing a negative overlap period wherein both of an intake and an exhaust valve are closed. This increases the temperature inside of the combustion chamber because a higher quantity of exhaust gases is retained in the combustion chamber. Auto-ignition is further promoted by producing an active air-fuel mixture that has high ignition performance. This is achieved by injecting a part of the fuel directly into the combustion chamber in the negative overlap period. This process causes the injected fuel to evaporate immediately into the higher temperature exhaust gases. As a result, the fuel is broken down into radical molecules having broken molecular chains, or the fuel can be oxidized into an aldehyde, both of which may promote auto-ignition as the piston approaches top-dead-center.

However, the inventors herein have recognized that there is room for further improvement of this example. Specifically, at engine operating conditions where combustion chamber temperature is low, thermal efficiency or engine emissions can degrade since auto-ignition may not occur at the appropriate time, even if injecting a part of fuel is implemented in the negative overlap period.

Another example of a method of operating a gasoline engine using HCCI combustion is described by U.S. Pat. No. 7,234,438. This patent describes spark-assisted HCCI combustion. Specifically, the method comprises bringing the temperature of the combustion chamber close to auto-ignition temperature by adjusting engine operating conditions. In one embodiment, a small cloud of stratified air-fuel mixture is formed near the spark plug. The fuel cloud is ignited by a spark from the spark plug. This action causes cylinder pressure to rise, thereby producing auto-ignition at other sites in the cylinder. This method also describes dividing engine operation into three different combustion modes that are determined with respect to engine speed and load. HCCI mode is operational at lower engine speeds and loads and appears to be surrounded by a spark assisted HCCI mode region. Further, the spark ignition (SI) combustion mode appears to be reserved for areas of higher engine speeds and loads as well as engine speeds and loads that are lower than those reserved for spark assisted HCCI mode region. According to the method described in U.S. Pat. No. 7,234,438, spark assisted HCCI combustion is used at both of lower and higher engine speed and load conditions than the engine speed and load conditions where HCCI combustion with no spark-assist is implemented.

However, the inventors herein have recognized that the amount of NOx produced by the engine at lower speeds and loads can be undesirable if spark assisted HCCI is implemented as described in this patent.

One embodiment of the present description includes method to operate an internal combustion engine having a combustion chamber with a piston and a spark plug, the method comprising: during a first mode, bringing the temperature of the combustion chamber to auto-ignition temperature by adjusting engine operating conditions and producing auto-ignition in said combustion chamber without requiring spark from said spark plug; and during a second mode, bringing the temperature of the combustion chamber close to auto-ignition temperature by adjusting engine operating conditions, forming a small cloud of stratified air-fuel mixture near said spark plug, igniting said fuel cloud by a spark form said spark plug, and then causing cylinder pressure to rise, thereby producing auto-ignition at other sites in said combustion chamber wherein said first mode is implemented in a first operating range and said second mode is implemented only in a second operating range where engine speed and load are lower than said first operating range.

This method overcomes at least some of the disadvantages of the prior art.

Thermal efficiency or engine emissions can be improved by using spark assisted HCCI combustion in low engine speed and load conditions. Further, by implementing spark assisted HCCI only at lower engine speed and load conditions than HCCI combustion, NOx production by igniting stratified air-fuel mixture can be decreased under relative high engine speed and load conditions while keeping HCCI combustion stable.

A second embodiment of the present description includes a method to operate an internal combustion engine having a combustion chamber with a piston and a spark plug, the method comprising: during a first mode, bringing the temperature of the combustion chamber to auto-ignition temperature by adjusting engine operating conditions and producing auto-ignition in said combustion chamber without requiring spark from said spark plug; during a second mode, bringing the temperature of the combustion chamber close to auto-ignition temperature by adjusting engine operating conditions, forming a small cloud of stratified air-fuel mixture near said spark plug, igniting said fuel cloud by a spark from said spark plug, and then causing cylinder pressure to rise, thereby producing auto-ignition at other sites in said combustion chamber; and during a third mode, producing substantially homogenous air-fuel mixture having substantially stoichiometric air fuel ratio is produced in said combustion chamber and igniting said substantially homogenous air-fuel mixture by a spark form said spark plug, wherein said first mode is implemented in a first operating range, said second mode is implemented only in a second operating range where engine speed and load are lower than said first operating range and said third mode is implemented in a third operating range where engine speed and load are lower than said second operating range, and wherein, for a predetermined time period in transition between said second mode and said third mode, only stratified air-fuel mixture is produced in said combustion chamber by providing fuel into said combustion chamber directly in compression stroke and said stratified air-fuel mixture is ignited by a spark form said spark plug.

This method also overcomes at least some of the disadvantages of the prior art and has further advantage.

Thermal efficiency and engine emissions can be improved by using spark assisted HCCI combustion in low engine speed and load conditions. Further, by implementing spark assisted HCCI only at lower engine speed and load conditions than HCCI combustion, NOx production by igniting stratified air-fuel mixture can be decreased under relative high engine speed and load conditions while keeping HCCI combustion stable. Further, the engine combustion stability during mode transition between spark assisted HCCI combustion mode and SI mode where engine speed and load are too low to bring the temperature of the combustion chamber to auto ignition temperature even if spark assist is used can be improved by producing only stratified air-fuel mixture in the combustion chamber by providing fuel into the combustion chamber directly in compression stroke and igniting the stratified air-fuel mixture by a spark form said spark plug.

DETAILED DESCRIPTION

Hereinafter, a first embodiment of the invention will be explained in detail based on the appended drawings. The following descriptions of embodiments of the invention are illustrations, and are not intended to limit the scope of the invention, applications, and objects to which the invention may be applied.

[Entire Configuration]

Figure 1:
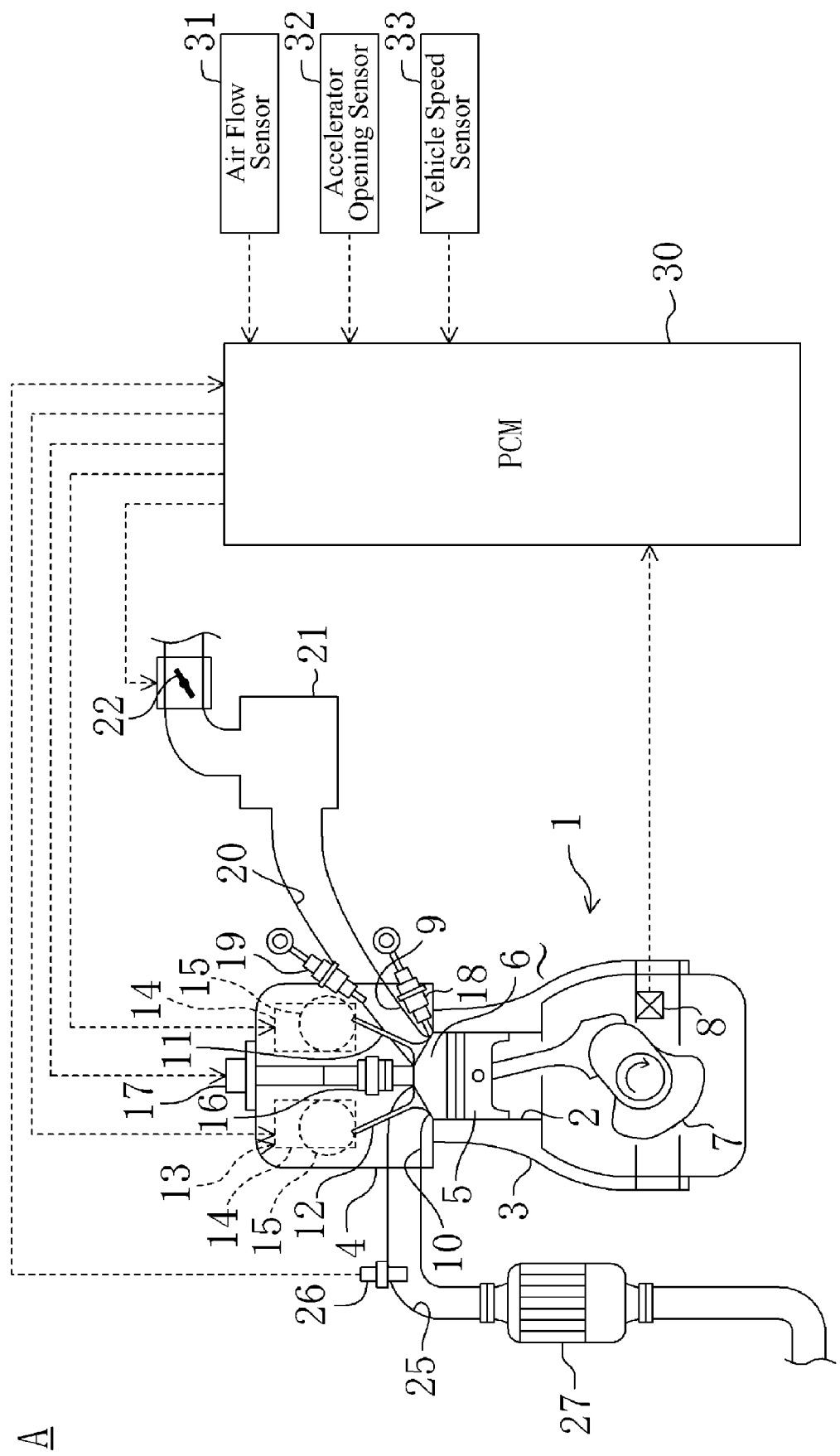
FIG. 1 is a block diagram showing the entire configuration of an engine control device according to an embodiment of the invention.

FIG. 1 shows the entire configuration of an engine control device A according to an embodiment of the invention. A reference numeral "1" indicates a multi-cylinder gasoline-type internal combustion engine equipped on a vehicle. The engine body includes a cylinder block 3 having two or more cylinders 2 (only one is illustrated), and a cylinder head 4 arranged above the cylinder block 3. A piston 5 is fitted and inserted into each cylinder 2, and a combustion chamber 6 is formed inside the cylinder 2 between a top surface of the piston 5 and the bottom surface of the cylinder head 4. The piston 5 is coupled to a crankshaft 7 with a connecting rod, and a crank angle sensor 8 for detecting a rotational angle of the crankshaft 7 (i.e., crank angle) is attached to an end of the crankshaft 7.

The cylinder head 4 is formed with an air-intake port 9 and an exhaust port 10 such that they open through a ceiling portion of the combustion chamber 6 for each cylinder 2. The intake port 9 extends obliquely upward from the ceiling portion of the combustion chamber 6, and opens to one side of the cylinder head 4, while the exhaust port 10 opens to the other side (i.e., opposite side). The intake port 9 and the exhaust port 10 are opened and closed by an intake valve 11 and an exhaust valve 12, respectively. The intake and exhaust valves 11 and 12 are driven by cam shafts (not shown) of a valve operating mechanism 13 arranged inside the cylinder head 4 so as to synchronize with a rotation of the crankshaft 7.

The valve operating mechanism 13 incorporates a known variable valve lift mechanism 14 (hereinafter, abbreviated as "VVL") that can continuously change a valve lift, and a known variable valve timing mechanism 15 (hereinafter, abbreviated as "VVT") that can continuously change a phase angle with respect to a crank rotation for certain valve lift, on the intake and exhaust side, respectively. The valve operating mechanism 13 can change lift characteristics of the intake and exhaust valves 11 and 12, and can adjust a filling amount of the intake air into the cylinder 2 or an amount of burned gas kept in the combustion chamber (i.e., internal EGR gas). Here, VVL 14 may be what is described in Japanese Unexamined Patent Publications No. 2006-329022 and No. 2006-329023, for example.

Further, a spark plug 16 is disposed so that an electrode thereof projects into the combustion chamber 6 from the ceiling portion of the combustion chamber 6 of each cylinder 2, and an ignition circuit 17 supplies power to the spark plug 16 at a predetermined ignition timing. On the other hand, an injector 18 for direct injection into the cylinder 2 is disposed so that its injection end projects into a circumference of the combustion chamber 6 on the intake side. The direct injector 18 is of a small capacity that is capable of controlling a flow rate of fuel with high accuracy when injecting a relatively small amount of the fuel. Thus, when injecting a small amount of the fuel after the middle stage of the compression stroke of the cylinder 2, a stratified air-fuel mixture in which a small cloud of air-fuel mixture is unevenly distributed in proximity to the electrode of the spark plug 16 is formed.

Further, in this embodiment, a port injector 19 (another fuel injection valve) is disposed so that it injects fuel into the intake port 9. The port injector 19 is of a large capacity that is capable of injecting a larger amount of fuel corresponding to the maximum torque of the engine 1. The port injector 19 can achieve a sufficient injection time also in a high engine speed range, by injecting fuel from the compression stroke to the expansion, exhaust, and intake strokes of the cylinder 2. As such, atomized, injected fuel flows into the cylinder 2 with the intake air, and then is widely distributed inside the cylinder 2, where it expands its volume as the piston 5 lowers to form a substantially homogeneous air-fuel mixture.

Although not illustrated, high-pressure and low-pressure fuel supply lines are connected to the injectors 18 and 19 of each cylinder 2, respectively. The low-pressure supply line supplies fuel which is sucked from a fuel tank by a low-pressure fuel pump. On the other hand, a high-pressure fuel pump for pressurizing and supplying fuel is provided in the high-pressure supply line branched from the low-pressure supply line.

In FIG. 1, an intake system is disposed on one side of the cylinder head 4 (that is, located on the right side of the engine 1), while an air intake passage 20 communicates with the intake port 9 of each cylinder 2. The air intake passage 20 supplies air filtered by an air cleaner located outside the figure to the combustion chamber 6 of each cylinder 2 of the engine 1. An electrically-operated throttle valve 22 is disposed in a common passage upstream of a surge tank 21. The air intake passage 20 branches for every cylinder 2 downstream of the surge tank 21, and communicates with each intake port 9.

On the other hand, an exhaust system is disposed on the other side of the cylinder head 4, and an exhaust passage 25 (e.g., an exhaust manifold) branched for each cylinder 2 is connected to the exhaust port 10 of each cylinder 2. A sensor 26 for detecting an oxygen concentration in the exhaust gas is disposed in the gathering portion of the exhaust manifold. Further, a catalyst 27 for purifying harmful components in the exhaust gas is disposed in the exhaust passage 25 downstream of the exhaust manifold.

Figure 2:
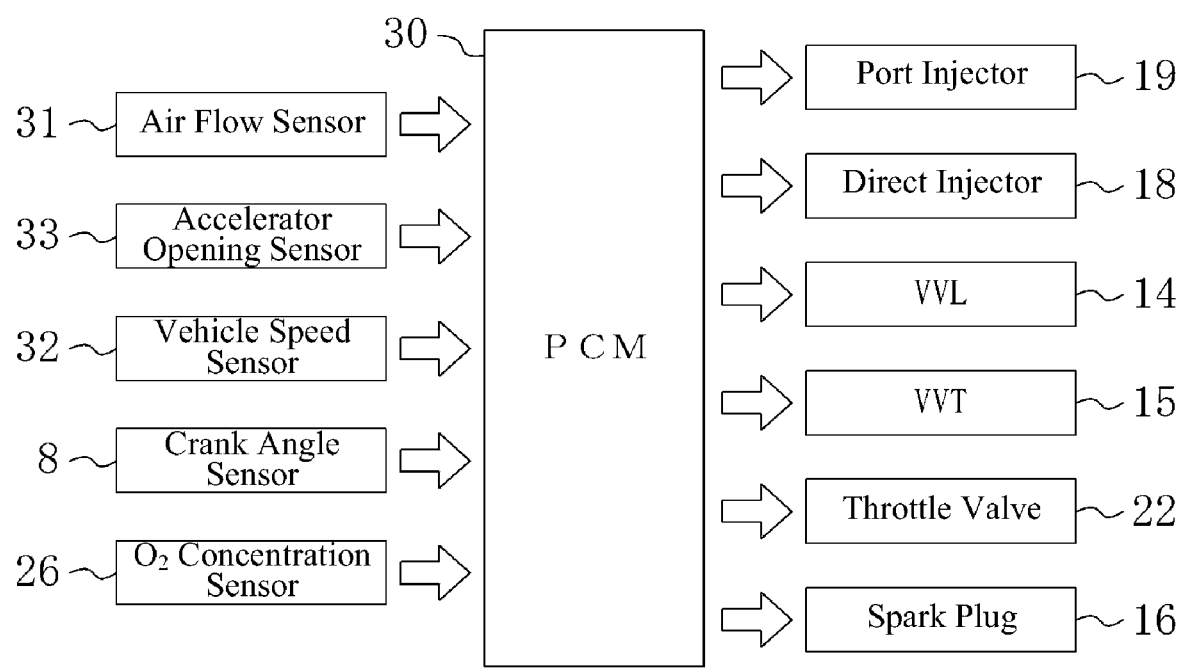
FIG. 2 is a block diagram showing a particular configuration of the engine control device shown in FIG. 1.

In order to perform a control of the engine 1 configured as described above, a power train control module 30 (hereinafter, referred to as "PCM") is provided. PCM 30 includes a CPU, memory, I/O interface circuit, and so forth, as is well-known. As also shown in FIG. 2, signals from the crank angle sensor 8 for detecting a crank angular speed related to an engine speed, an oxygen concentration sensor 26, and the like, are inputted to PCM 30. Further, at least a signal from an airflow sensor 31 for measuring a flow rate of air through the air intake passage 20, a signal from an accelerator opening sensor 32 for detecting an amount of operation of a gas pedal (not illustrated) related to an engine load (i.e., accelerator opening), and a signal from a traveling speed sensor 33 for detecting a traveling speed of the vehicle, are inputted to PCM 30.

PCM 30 determines an operating condition of the engine 1 (for example, the engine load and engine speed) based on the signals from the various sensors, and PCM 30 controls VVL 14, VVT 15, ignition circuit 17, direct injector 18, port injector 19, and electrically-operated throttle valve 22 based on the operating condition. Specifically, PCM 30 adjusts the lifts of the intake and exhaust valves 11 and 12 mainly by the operation of VVL 14, and controls a filling amount of the intake air into the cylinder 2. Further, PCM 30 adjusts the lifts of the intake and exhaust valves 11 and 12, and controls the amount of internal EGR gas mainly by the operation of VVT 15.

Figure 3:
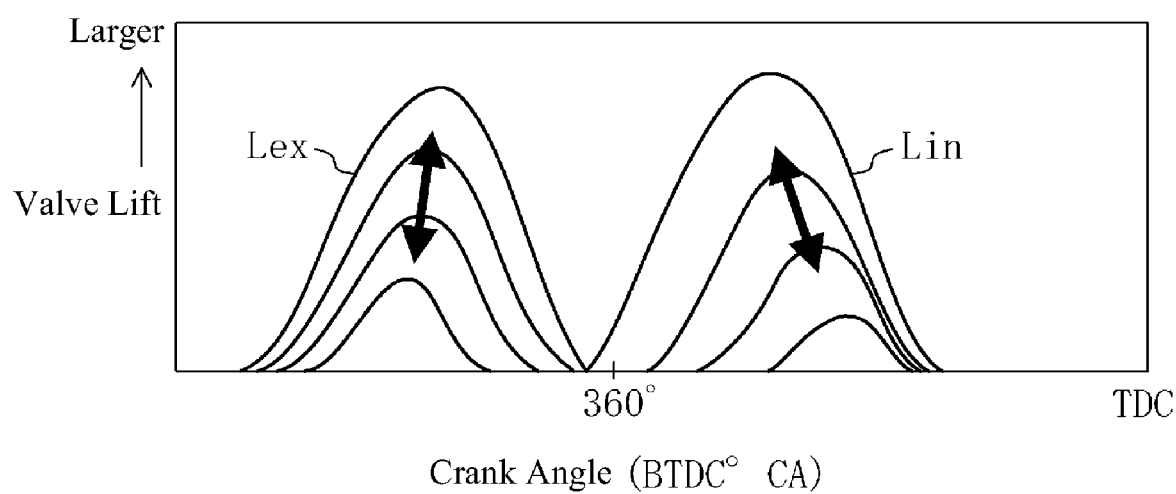
FIG. 3 is a graph showing a lift characteristic of intake and exhaust valves.

According to the controls of VVL 14 and VVT 15, lift curves Lin, Lex of the intake and exhaust valves 11 and 12 continuously change between the minimum lift and the maximum lift, as schematically shown in FIG. 3. The lifts of the intake and exhaust valves 11 and 12 become larger as the engine load (or required torque) and engine speed of the engine 1 become higher and, thus, an overlapped period (i.e., positive overlapped period) may be produced accordingly. On the other hand, for a lower load and lower engine speed, a negative overlapped period in which the both intake and exhaust valves 11 and 12 close may be produced, and the amount of internal EGR gas increases considerably.

Thus, because the filling amount of the intake air into the cylinder 2 can mainly be changed within a wide range by the control of VVL 14, power can be controlled without depending on the control of the throttle valve 22 for the engine 1 in this embodiment. That is, the throttle valve 22 provided in the air intake passage 20 is mainly for fail-safe operation, and is normally fully opened also in the partial-load range of the engine 1 to reduce pump losses.

Further, PCM 30 switches the air fuel ratio or the formation of the air-fuel mixture in the cylinder 2 by operating each of the two injectors 18 and 19 at predetermined timings, as will be described later. In addition, PCM 30 switches the combustion state of the engine 1 between HCCI combustion and SI combustion, which will be described below, by controlling the amount of internal EGR gas in the cylinder 2 mainly by the operation of VVT 15 as described above, and switching the operating condition of the spark plug 16.

[Outline of Engine Control]

Figure 4:
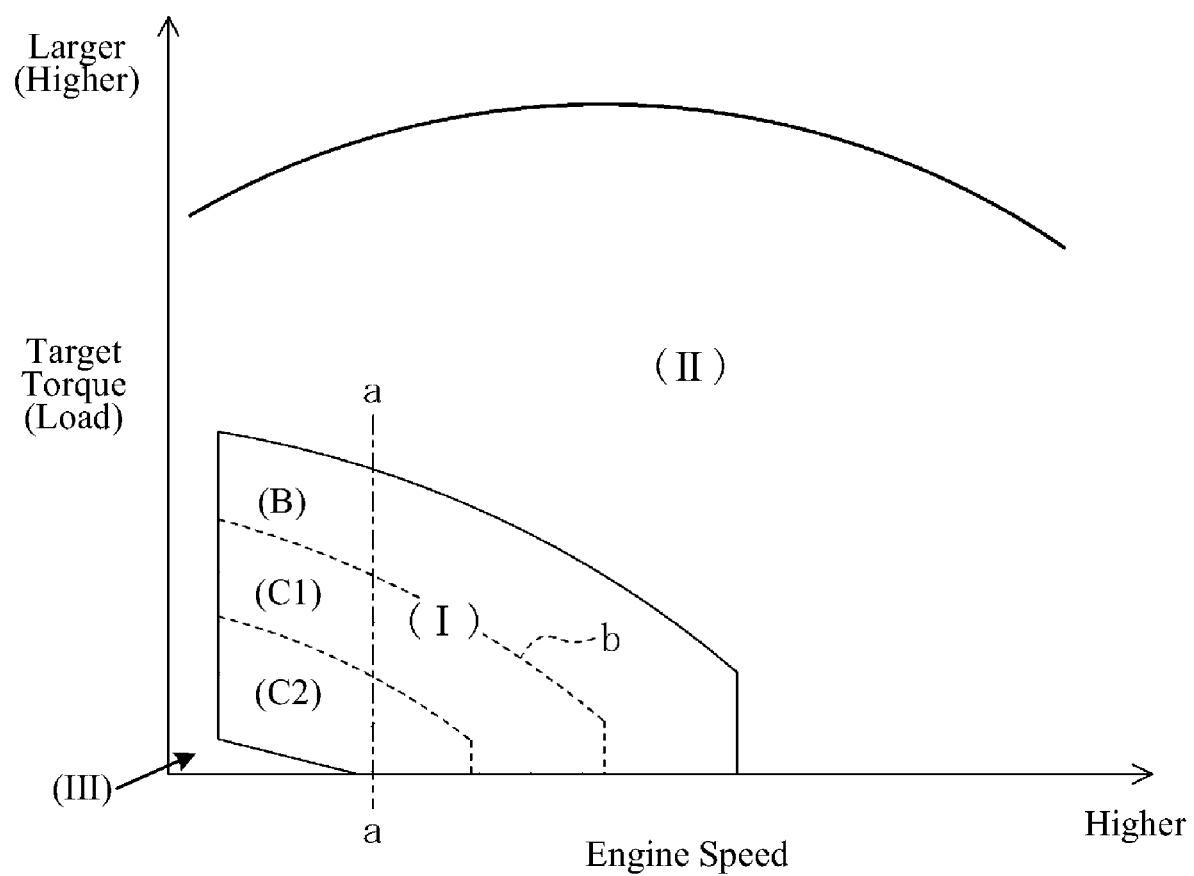
FIG. 4 is a graph showing an example of a control map for switching between combustion modes.

Specifically, as shown in FIG. 4, an example of a control map is configured such that the substantially homogeneous air-fuel mixture formed in the cylinder 2 is compressed by rising of the piston 5 within an operating range (I) in which the engine load and engine speed are relatively low, and auto ignition in which the substantially homogeneous air-fuel mixture is not directly ignited is performed. In this case, fuel is basically injected into the intake port 9 by the port injector 19 during the intake stroke of the cylinder 2, and is supplied into the cylinder 2 while mixing the fuel with the intake air to form the substantially homogeneous air-fuel mixture.

Further, a period between the exhaust stroke and the intake stroke of the cylinder 2 after the exhaust valve 11 closes until the intake valve 12 opens (the negative overlapped period in which the both intake and exhaust valves 11 and 12 close) is provided. During this period, by increasing a temperature inside the cylinder 2 with a large amount of internal EGR gas, the auto ignition of the substantially homogeneous air-fuel mixture can be stimulated. As the negative overlapped period becomes relatively longer, the amount of internal EGR gas also increases, and the timing of auto ignition advances.

Figure 5:
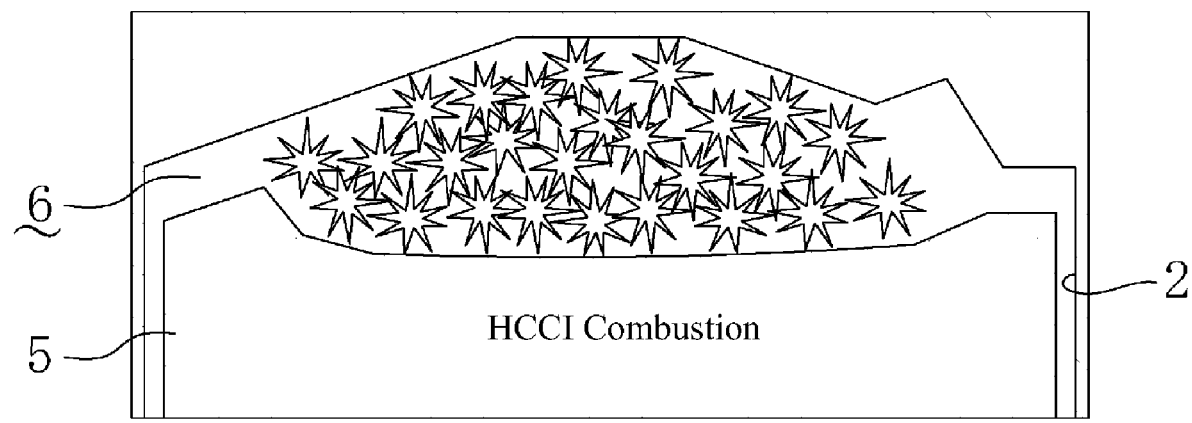
FIG. 5 is a schematic view of HCCI combustion.

Conventionally, such an auto ignition according to the compression of the substantially homogeneous air-fuel mixture is referred to as "HCCI (Homogeneous Charge Compression Ignition)." It is considered that HCCI combustion starts when the substantially homogeneous air-fuel mixture carries out the auto ignition substantially all at once at a number of locations inside the combustion chamber 6 of the cylinder 2, as schematically shown in FIG. 5. Therefore, HCCI combustion has a shorter combustion period and higher thermal efficiency as compared to the conventional common combustion by flame propagation (i.e., Spark Ignition Combustion or SI combustion).

Further, as such, HCCI combustion in which the substantially homogeneous air-fuel mixture carries out the auto ignition can be realized even with an extremely lean air-fuel mixture by which SI combustion is difficult to realize, or an air-fuel mixture diluted by a large amount of internal EGR gas. Because a burning temperature is low when the combustion period is short as described above, there is very little generation of nitrogen oxide. In other words, not so lean air-fuel mixture or an air-fuel mixture of low dilution rate causes an excessively earlier timing of the auto ignition and, thus, so-called "knock" may occur.

That is, HCCI combustion is realized with a quite lean air-fuel mixture or an air-fuel mixture diluted by a large amount of EGR gas. In addition, because substantially high power can not be obtained from HCCI combustion, the conventional common SI combustion is performed in the operating range (II) of a higher engine load or higher engine speed, and an operating range (III) of an extremely low engine load or extremely low engine speed, as shown in the control map (FIG. 4). Hereinafter, the operating range (I) is referred to as an "HCCI range (I)," and the operating ranges (II and III) are referred to as "SI ranges (II and III)."

Figure 6A:
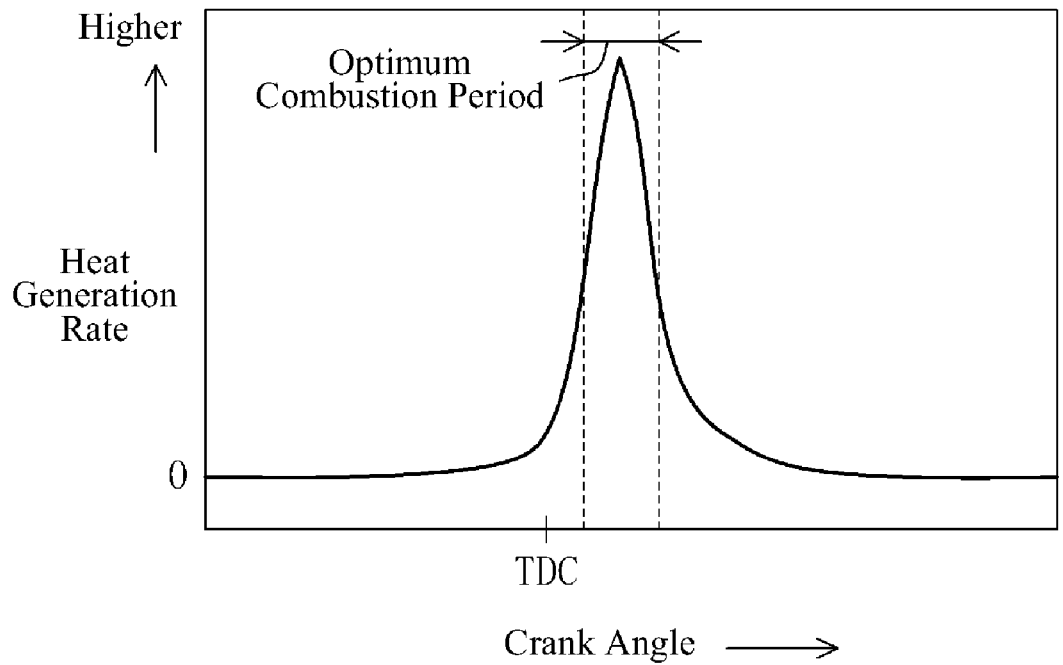
FIG. 6A is a graph showing heat generation during HCCI combustion.

As schematically shown in FIG. 6A, the highest thermal efficiency with HCCI combustion can be obtained when the substantially homogeneous air-fuel mixture carries out the auto ignition immediately after the top dead center (TDC) of the cylinder 2, and the peak of the heat generation due to the auto ignition then retards slightly more than TDC (e.g., approximately 2-8 degrees of the crank angle). At this time, because the temperature increase inside the cylinder 2 by HCCI combustion and the increase in the internal volume of the cylinder 2 according to the lowering of the piston 5 cancel out for each other, there is also an advantage that the combustion will not be excessively intense even when the amount of fuel injection is relatively large.

Figure 6B:
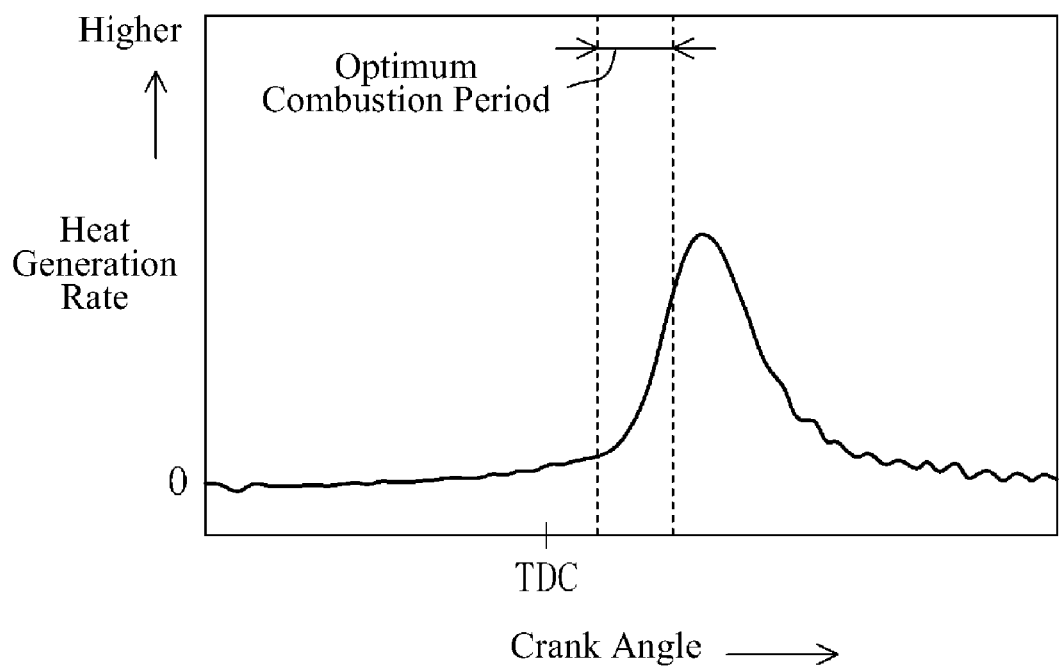
FIG. 6B is another graph showing heat generation during HCCI combustion.

However, it is very difficult to always carry out the auto ignition of the substantially homogeneous air-fuel mixture all at once at such a suitable timing. For example, if the load and engine speed of the engine 1 become relatively low, and the compression temperature or compression pressure inside the cylinder 2 becomes low accordingly, variation in the timing of the auto ignition of the substantially homogeneous air-fuel mixture inside the cylinder 2 becomes larger, and the peak of heat generation becomes lower as shown in FIG. 6B, while it shifts to the retard side. In this case, a thermal efficiency is lowered, and an amount of fuel discharged in non-combusted state (including hydrocarbons, etc.) will increase.

Figure 7:
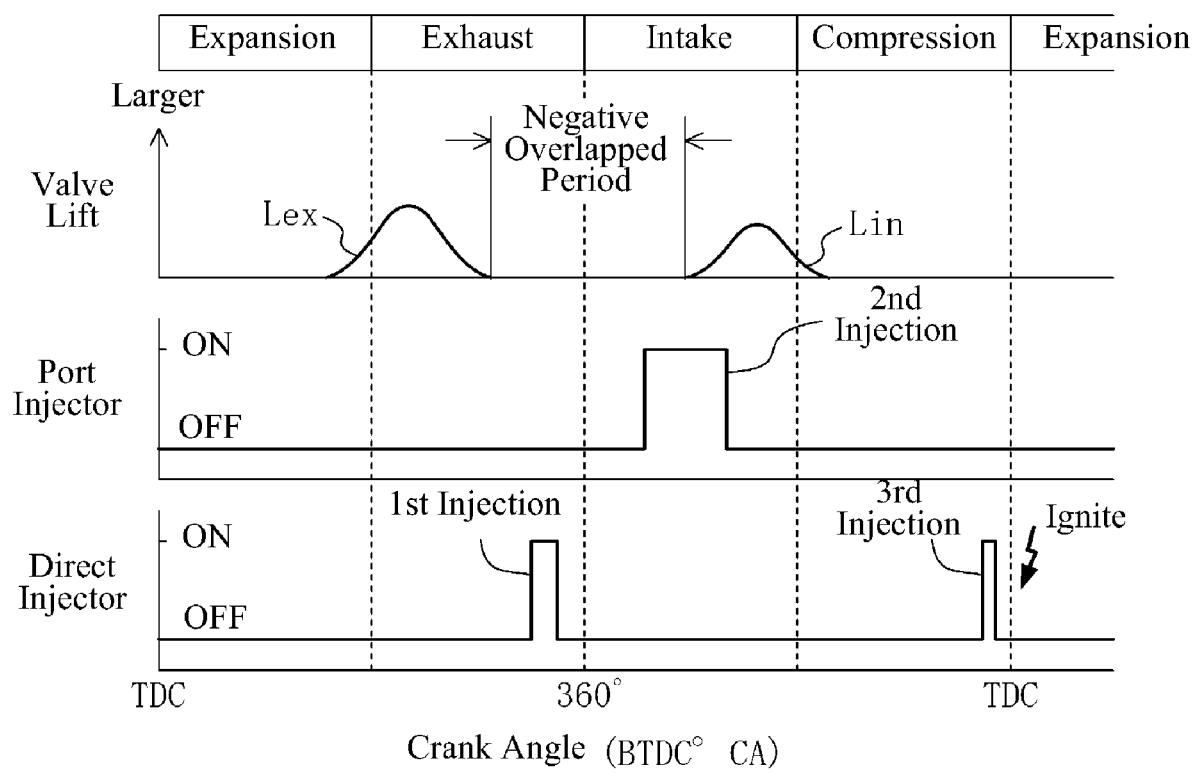
FIG. 7 is a timing chart showing a mode of the fuel injection by two injectors.

To address such a problem, in this embodiment, when the engine 1 is under low engine load or intermediate engine load and low engine speed or intermediate engine speed within the HCCI range (I) (a range (C1) which is shown with slanted hatching in FIG. 4), a small cloud of the stratified air-fuel mixture which is unevenly distributed in proximity to the electrode of the spark plug 16 (i.e., stratified air-fuel mixture) is formed by injecting a small amount of fuel from the direct injector 18 at the end of the compression stroke of the cylinder 2 (third fuel injection), as shown in FIG. 7, and the stratified air-fuel mixture is then ignited at a predetermined timing immediately after the compression top dead center (TDC) to burn.

Thus, when the combustion occurs by igniting the stratified air-fuel mixture around the spark plug 16, then, the temperature and pressure inside the cylinder 2 further increases, and air-fuel mixture at the other locations inside the combustion chamber is induced to carry out auto ignition. Therefore, it is possible to correctly and stably control the auto-ignition timing of the substantially homogeneous air-fuel mixture.

Further, in the HCCI range (I), especially in a range (C2) which is shown with cross-hatching in FIG. 4 within a range in which the temperature inside the cylinder 2 is low with low engine load and low engine speed, a fuel injection (first injection) by the direct injector 18 is performed also during the negative overlapped period of the intake and exhaust valves 11 and 12. Thus, because radicals are produced during a period when atomized fuel is exposed to the high-temperature internal EGR gas, and a partial oxidation reaction proceeds, it is considered that the active air-fuel mixture that is easy to auto-ignite can be formed.

As shown in FIG. 4, the map is divided into the range (C1 and C2) in which ignition to the stratified air-fuel mixture is performed within the HCCI range (I), and the range (B) of higher engine load in which the ignition is not performed, by a boundary line b that inclines such that the engine load of the engine 1 is higher as the lower engine speed decreases. Thus, ignition to the stratified air-fuel mixture is performed only when needed, according to the original temperature condition of the cylinder 2.

[Specific Control Procedure]

Next, a specific procedure of the engine control will be described with reference to a flowchart shown in FIG. 8. First, in Step S1 after starting this procedure, signals from the crank angle sensor 8, airflow sensor 31, accelerator opening sensor 32, and speed sensor 33 are inputted to PCM 30. In Step S2, PCM 30 calculates a torque required for the engine 1 (i.e., engine load) and an engine speed. For example, the engine speed may be directly calculated based on the signal from the crank angle sensor 8. Further, for example, the required torque may be directly calculated based on the traveling speed of the vehicle and the accelerator opening, or based on the signal from the airflow sensor 31 and the engine speed, along with the amount of internal EGR gas.

Based on the calculated required torque and engine speed, in Step S3, PCM 30 then determines whether the engine 1 is in the HCCI range (I) referring to the control map shown in FIG. 4. When the determination is NO, the engine 1 is in the SI ranges (II and III). Then, PCM 30, although a detailed explanation will be omitted, performs the control for the normal SI combustion. That is, PCM 30 causes the port injector 19 to inject fuel into the intake port 9 between the compression stroke and the intake stroke of the cylinder 2 to form the substantially homogeneous air-fuel mixture inside the cylinder 2 at approximately a stoichiometric air fuel ratio, and causes the spark plug 16 to ignite the substantially homogeneous air-fuel mixture.

On the other hand, when the determination in Step S3 is YES (that is, the engine 1 is in the HCCI range (I)), PCM 30 proceeds to Step S4 to control the operation timings of the intake and exhaust valves 11 and 12 so that the negative overlapped period is produced by controlling VVL 14 and VVT 15. In other words, PCM 30 determines the overlapped amount of the intake and exhaust valves 11 and 12 to obtain the required amount of internal EGR gas, with reference to the empirical map based on the required torque and engine speed, and then controls mainly VVT 15 to obtain the overlapped amount, for example.

In that case, based on the required torque and engine speed, the lifts of the intake and exhaust valves 11 and 12 which serve as a necessary air intake filling amount is also determined with reference to the empirical map (not shown), and VVL 14 is mainly controlled to obtain the determined lift. This air intake filling amount may be empirically calculated so that a suitable air fuel ratio can be obtained corresponding to the amount of fuel supplied to the cylinder 2, and may then be set in the map.

Next, in Step S5, PCM 30 reads three fuel injection amounts by the injectors 18 and 19 from the empirical injection amount map. The three fuel injection amounts includes a first injection amount by the direct injector 18 to form an active air-fuel mixture, a second injection amount by the port injector 19 to form substantially homogeneous air-fuel mixture, and a third fuel injection amount by the direct injector 18 to form a stratified air-fuel mixture.

This injection amount map also stores the empirical optimum values of the first, second, and third fuel injection amounts that are set corresponding to the required torque and engine speed. For example, when changes in the first, second, and third fuel injection amounts corresponding to the change in the required torque (i.e., engine load) are observed along a constant-engine-speed line a-a shown in the map of FIG. 4, they appear as in FIG. 9.

As illustrated, the first injection is performed only in the low engine load range (C2), and the third fuel injection is performed in the low engine load and intermediate load ranges (C1 and C2). The amount of the third fuel injection is constant, and is the minimum amount required to form the stratified air-fuel mixture to which the spark ignition is possible. In the example of the figure, the amount of the first injection also is, but is not limited to, a substantially constant amount. Further, the second injection is performed throughout (B, C1, and C2) in the HCCI range (I), and the amount of the second injection increases according to an increase in the required torque.

Then, in Step S6, PCM 30 determines whether to perform the first injection based on the injection amount (i.e., control target value) determined in Step S5. If the injection amount is 0 (that is, the determination is NO), PCM 30 proceeds to Step S9 described below. On the other hand, if the injection amount is not 0 (that is, the determination is YES), PCM 30 proceeds to Step S7, and determines whether it reaches the timing of the first injection. While the determination in Step 7 is NO, PCM 30 stands by, and when the determination becomes YES, PCM 30 proceeds to Step S8 to actuate the direct injector 18. In this embodiment, the timing of the first injection is set so that the valve opening of the direct injector 18 is contained in the negative overlapped period of the intake and exhaust valves 11 and 12.

Next, in Step S9, PCM 30 determines whether it reaches the timing of the fuel injection by the port injector 19 (i.e., second injection). If NO, PCM 30 stands by, and when it is YES, PCM 30 proceeds to Step S10 to actuate the port injector 19. Here, as an example, the timing of the second injection may be set between the mid-period of the intake stroke of the cylinder 2 and opening of the intake valve 11. Thus, the atomized fuel can be vigorously conveyed into the cylinder 2 by high-speed intake air that passes through a gap between a funnel-shaped portion of the intake valve 11 and the intake port 9.

Next, in Step S11, PCM 30 determines whether to perform the third fuel injection, similar to Step S6. If the injection amount is 0 (i.e., the determination is NO), PCM 30 returns to Step 1. If the injection amount is not 0 (i.e., the determination is YES), PCM 30 proceeds to Step S12 to determine whether it reaches the timing of the third fuel injection (i.e., the end of the compression stroke of the cylinder 2). If NO at step S12, PCM 30 stands by, and when the determination becomes YES, PCM 30 proceeds to Step S13 to actuate the direct injector 18.

In Steps S14 and S15, the stratified air-fuel mixture formed around the spark plug 16 with the fuel injected into the cylinder 2 by the direct injector 18 as the third fuel injection is ignited. Specifically, first, in Step S14, PCM 30 determines whether it reaches the ignition timing in proximity to TDC (preferably, immediately after TDC). If NO, PCM 30 stands by, and when it becomes YES, PCM 30 proceeds to Step S15 to actuate the ignition circuit 17, and then, returns to Step 1.

Figure 8:
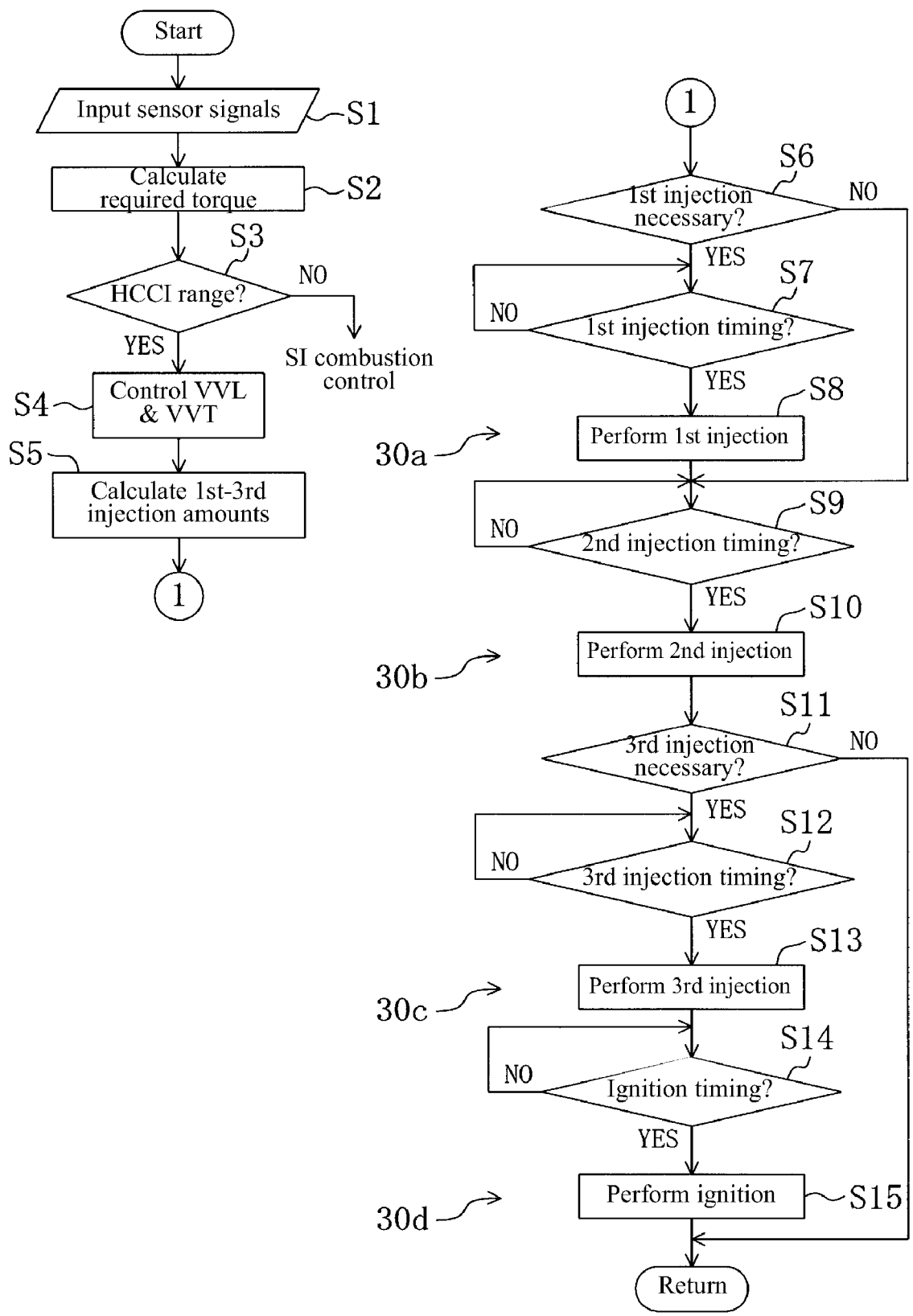
FIG. 8 is a flowchart showing a procedure of the control for switching between the combustion modes.

Steps S5-S8 in FIG. 8 comprise an active air-fuel mixture forming module 30_a_ that causes the direct injector 18 to directly inject fuel into the cylinder 2 in the negative overlapped period of the intake and exhaust valves 11 and 12 to form the active air-fuel mixture with high ignition performance when the engine 1 is in the range (C2) of lower engine load and lower engine speed within the HCCI range (I).

Further, Steps S5, S9, and S10 comprise a mixture forming module 30_b_ that causes the port injector 19 to inject fuel to supply the fuel into the cylinder 2 at least during the intake stroke, and thereby forming the substantially homogeneous air-fuel mixture.

Further, Steps S5, and S11-S13 comprise a stratified mixture forming module 30_c_ that causes the direct injector 18 to inject a small amount of fuel into the cylinder 2 during the compression stroke, and thereby forming the stratified air-fuel mixture that is unevenly distributed around the spark plug 16 when the engine 1 in the ranges (C1 and C2) of lower to intermediate load and lower to intermediate engine speed within the HCCI range (I).

Further, Steps S14 and S15 comprise, an ignition control module 30_d_ that causes the spark plug 16 to ignite the stratified air-fuel mixture at a predetermined timing when the engine 1 is in the ranges (C1 and C2) of lower to intermediate load and lower to intermediate engine speed within the HCCI range (I).

The control of the flowchart in FIG. 8 is realized by execution of a control program that is electronically stored in the memory of PCM 30. In this sense, PCM 30 includes the active air-fuel mixture forming module 30_a_, the mixture forming module 30_b_, the stratified mixture forming module 30_c_, and the ignition control module 30_d_, each of which is in a form of software program.

Therefore, according to the engine control device A described above, the gasoline engine 1, which provides so-called negative overlapped period of the intake and exhaust valves 11 and 12, and increases the temperature inside the cylinder 2, thereby stimulating the compressed auto ignition of the substantially homogeneous air-fuel mixture, can inject fuel into the EGR gas in the cylinder 2 during the negative overlapped period that is separated from the fuel supplied for the formation of the substantially homogeneous air-fuel mixture to form the active air-fuel mixture with high ignition performance. Further, the engine 1 can inject a small amount of fuel into the cylinder 2 also during the compression stroke, and causes the cloud of the air-fuel mixture stratified around the spark plug 16 to ignite and burn, and thereby certainly causing the auto ignition of the entire substantially homogeneous air-fuel mixture.

Thus, the HCCI range (I) may be expandable to the range of lower engine load and lower engine speed in which stable HCCI combustion could not be realized conventionally. Further, it is possible to optimize the auto-ignition timing of the substantially homogeneous air-fuel mixture to fully acquire the improvements in fuel consumption or emission due to HCCI combustion.

In addition, the amount of the fuel injection to form the stratified air-fuel mixture as described above (i.e., third fuel injection) is not based on the size of the required torque of the engine 1 (i.e., engine load), but is the minimum amount required to form the stratified air-fuel mixture to which the spark ignition is possible. Therefore, generation of nitrogen oxide due to the spark-ignited combustion can be suppressed as much as possible.

Further, in this embodiment, formation and combustion by ignition of the stratified air-fuel mixture is performed only when they are needed, and is not performed in a range in which HCCI combustion can be stably performed (i.e., a range (B) of higher load or higher engine speed within the HCCI range (I)). Thus, generation of nitrogen oxide due to the spark-ignited combustion can be avoided.

Further, in this embodiment, the fuel injection to form the substantially homogeneous air-fuel mixture inside the cylinder 2 is configured to perform by the port injector 19. Thus, because the injector 19 is of larger capacity than the direct injector 18, it is easier to secure a large amount of injection required for the maximum torque of the engine 1 for SI combustion. On the other hand, the direct injector 18 may be of smaller capacity to advantageously secure control accuracy for a small amount of fuel injection.

Other Embodiments

Figure 9:
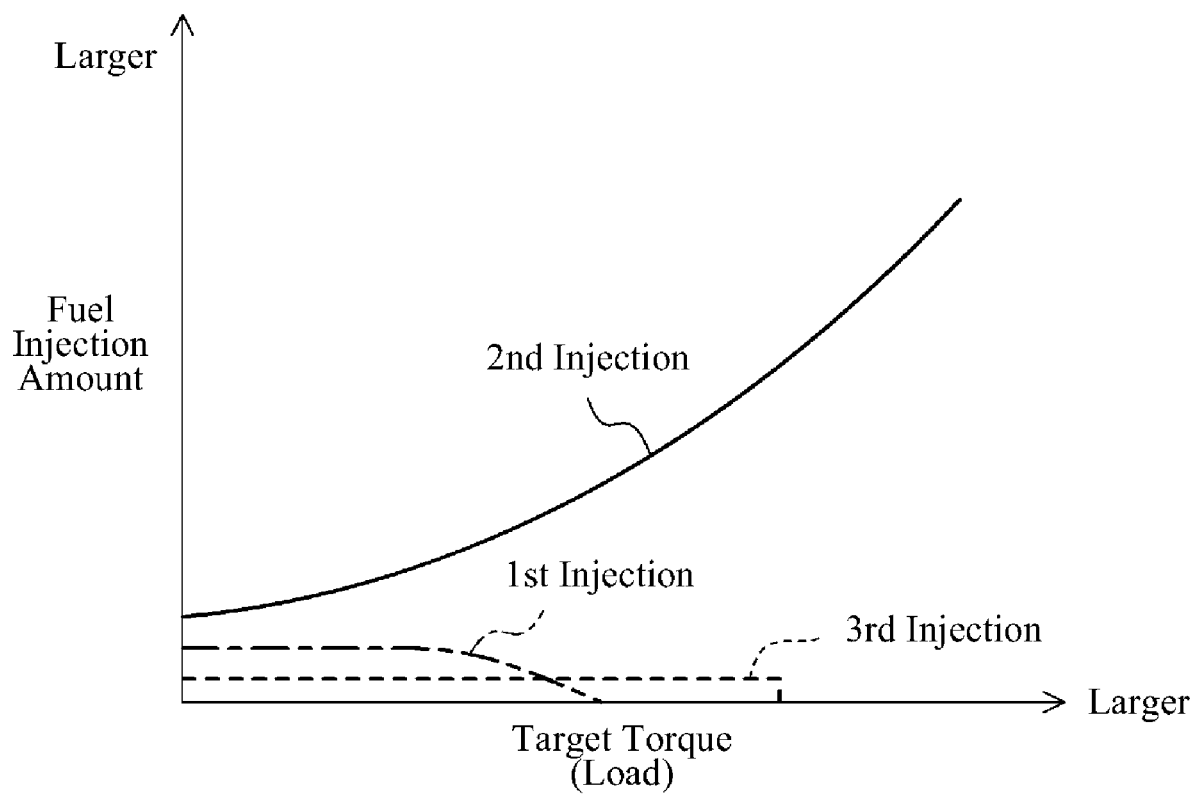
FIG. 9 is a graph showing changes in amount of a first, second, and third fuel injections with respect to a required torque along a constant-engine-speed line.

The embodiments according to the invention may include the other various configurations, without being limited to the embodiment described above. Specifically, in the previous embodiment, as shown in FIG. 9, the amount of the third fuel injection to form the stratified air-fuel mixture is, but is not limited to, a substantially constant amount, and may be changed according to the operating condition of the engine 1. Further, the third fuel injection may be performed throughout the HCCI range (I).

Similarly, the first injection to form the active air-fuel mixture may be performed up to higher engine load, however, this may serve as a trade-off with inhibition of knock. Further, depending on fuel property, the first injection may not be necessary. On the contrary, the first injection may be needed throughout the HCCI range (I).

Further, in the previous embodiment, the second injection to form the substantially homogeneous air-fuel mixture is performed during the intake stroke of the cylinder 2. Because the second injection is performed by the port injector 19, the injection may be performed during the exhaust stroke, or the expansion stroke or the compression stroke before the exhaust stroke.

Alternatively, it is also possible to perform the first, second, and third fuel injections only by the direct injector 18 without providing the port injector 19 to the engine 1.

Further, in the previous embodiment, the lift characteristics of the intake and exhaust valves 11 and 12 are continuously changed by the operation of VVL 14 and VVT 15. However, it is not limited to this, and either one of the lift amounts and the phase angles may be changed stepwise. Further, it will be appreciated that a valve operating mechanism for opening and closing the intake and exhaust valves 11 and 12 individually by an electromagnetic actuator may be utilized.

Second Embodiment

Next, the second embodiment of the invention will be described in detail based on the drawings. In this embodiment, the entire configuration and the control block diagram of the power train control module 30 (PCM) for performing the control of the engine 1, and the lift curves Lin and Lex of the intake and exhaust valves 11 and 12 by the control of VVL 14 and VVT 15 are similar to that of the first embodiment described above and, thus, the explanation thereof will be omitted herein.

[Outline of Engine Control]

Figure 10:
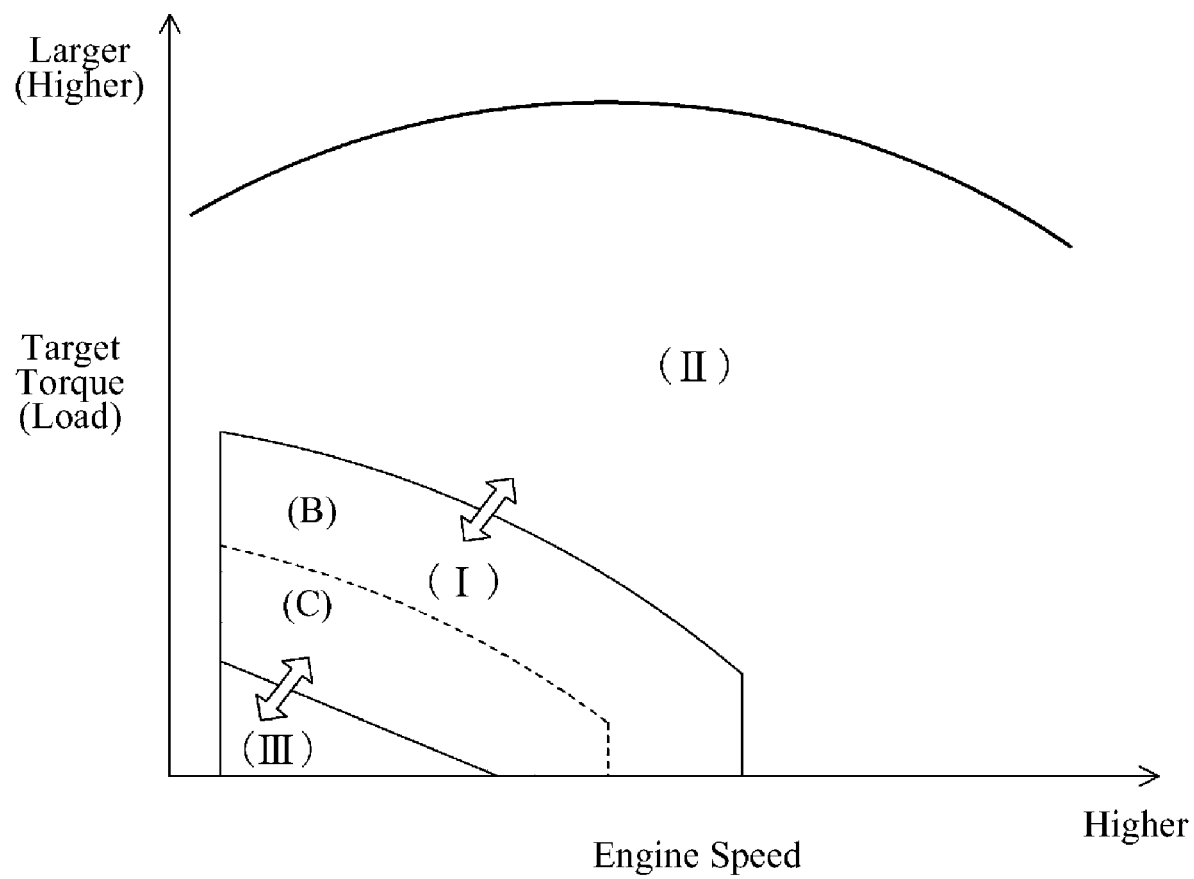
FIG. 10 is a graph showing another example of a control map for switching between the combustion modes.

Specifically, as shown in FIG. 10, an example of the control map is configured so that the substantially homogeneous air-fuel mixture formed inside the cylinder 2 is not directly ignited in the operating range (I) of lower engine load and lower engine speed, but, instead, is compressed by rising of the piston 5, and auto-ignites (i.e., HCCI combustion). In this HCCI combustion, similar to the first embodiment, fuel is injected into the intake port 9 by the port injector 19 during the intake stroke of the cylinder 2, and the fuel is supplied into the cylinder 2 while mixing with intake air to form the substantially homogeneous air-fuel mixture. Under this circumstance, the amount of fuel injection is controlled so that the air fuel ratio inside the cylinder 2 becomes lean according to the air intake filling amount into the cylinder 2 requested by the signal of the airflow sensor 31.

Further, a period after the exhaust valve 11 closes until the intake valve 12 opens during the exhaust stroke or the intake stroke of the cylinder 2 (i.e., the negative overlapped period during which the both intake and exhaust valves 11 and 12 closed) is provided. By increasing the temperature inside the cylinder 2 with a large amount of internal EGR gas, auto ignition of the substantially homogeneous air-fuel mixture is stimulated. As the negative overlapped period becomes longer, the amount of internal EGR gas also increases, and the timing of auto ignition advances.

Also in this embodiment, as shown in the control map (FIG. 10), SI combustion is performed in the operating range (II) of higher load or higher engine speed. Specifically, fuel is injected into the intake port 9 by the port injector 19 during the compression stroke or intake stroke of the cylinder 2, and is supplied into the cylinder 2 while mixing with intake air to form substantially homogeneous air-fuel mixture (that is, spark-ignition mode). At this time, an amount of the fuel injection is controlled so that the air fuel ratio inside the cylinder 2 becomes approximately a stoichiometric air fuel ratio.

Further, the operating range (III) of lower engine load and lower engine speed than the HCCI range (I) is a range of idling of the engine 1 and in proximity to the idling in which a frequency of use is very low. However, stable auto ignition is difficult even if the temperature inside the cylinder 2 is increased with a large amount of internal EGR gas as described above. Thus, in this embodiment, also in this operating range (III) similar to the operating range (II), SI combustion is performed by carrying out spark ignition to the substantially homogeneous air-fuel mixture of a substantially stoichiometric air fuel ratio (that is, spark-ignition mode). Hereinafter, the operating range (I) is referred to as "HCCI range (I)," and operating ranges (II) and (III) referred to as "SI ranges (II) and (III)."

In this embodiment, in a range of lower engine load and lower engine speed (a range (C) shown with slanted hatching in FIG. 10), a fuel injection (first injection) by the direct injector 18 during the negative overlapped period of the intake and exhaust valves 11 and 12 within the HCCI range (I) is performed. Thus, it is considered that atomized fuel exposed to the internal EGR gas at a high temperature immediately evaporates, while the chain of molecules is cut off to generate radicals, and partial oxidation reaction progresses, to form the active air-fuel mixture for which it is easy to carry out the auto ignition.

As shown with a white arrow in FIG. 10, when the operating condition of the engine 1 shifts between the HCCI range (I) and the SI ranges (II) and (III), in order to switch to HCCI combustion (auto-ignition mode) and SI combustion (spark-ignition mode) accordingly, the fuel-injection mode, the air fuel ratio, or the amount of internal EGR gas must be changed. In particular, the amount of internal EGR gas gradually changes with the operations of VVL 14 or VVT 15, and cannot be instantly switched similar to the fuel-injection mode or the air fuel ratio.

For stable HCCI combustion, a large amount of internal EGR gas with approximately 60% or more EGR rate is desired. In addition, SI combustion of homogeneous air-fuel mixture is carried out at approximately 30% or less EGR rate. Thus, upon switching between them, for 2-5 combustion cycles of the engine 1, the EGR rate becomes approximately 30-60%, which makes stable HCCI combustion difficult, and further, the amount of internal EGR gas becomes too much for SI combustion.

Figure 11:
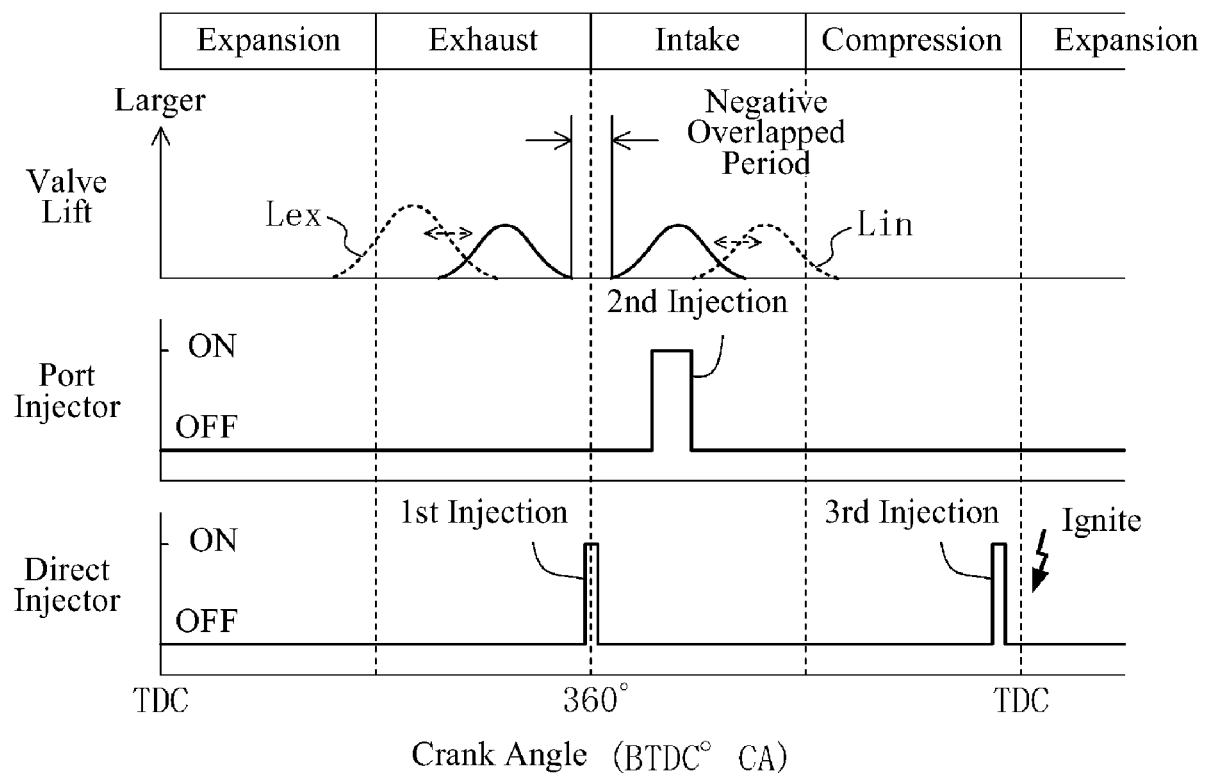
FIG. 11 is a timing chart showing another mode of the fuel injection by two injectors.

Accordingly, in this embodiment, upon the switching of the combustion mode as described above, auto ignition of the lean air-fuel mixture is induced during the transition by spark combustion of the stratified air-fuel mixture. Specifically, as an example shown in FIG. 11, even if the negative overlapped period of air-intake and exhaust changes upon the switching of combustion, the fuel injection (first injection) by the direct injector 18 is performed during the negative overlapped period to form the active air-fuel mixture that is easy to auto-ignite.

Then, fuel is injected by the port injector 19 during the intake stroke (second injection) to form substantially homogeneous air-fuel mixture inside the cylinder 2. Then, a small amount of fuel is injected by the direct injector 18 at the end of the compression stroke (third fuel injection) to form a cloud of the air-fuel mixture unevenly distributed in proximity to the electrode of the spark plug 16 (i.e., stratified air-fuel mixture). The air-fuel mixture is ignited at a predetermined timing immediately after the compression top dead center (TDC), and thereby burns.

Thus, by inducing the auto ignition of the substantially homogeneous air-fuel mixture by the ignition and combustion of the stratified air-fuel mixture, even if it is in a state in which the amount of EGR gas inside the cylinder 2 is insufficient during the transition of the switching, the lean air-fuel mixture can be stably auto-ignited. The amount of the third fuel injection may be the minimum amount required to form the stratified air-fuel mixture that can be ignited by a spark, and the required engine power is obtained mainly by the auto-ignited combustion of the substantially homogeneous air-fuel mixture. Hereinafter, the engine operating mode in which the auto ignition of the substantially homogeneous air-fuel mixture is induced (assisted) referred to as an "auto-ignition assist mode," and combustion during the mode is referred to as "SCCI (Stratified Charge Compression Ignition) combustion," in distinction from HCCI combustion.

[Specific Control Procedure]

Figure 12:
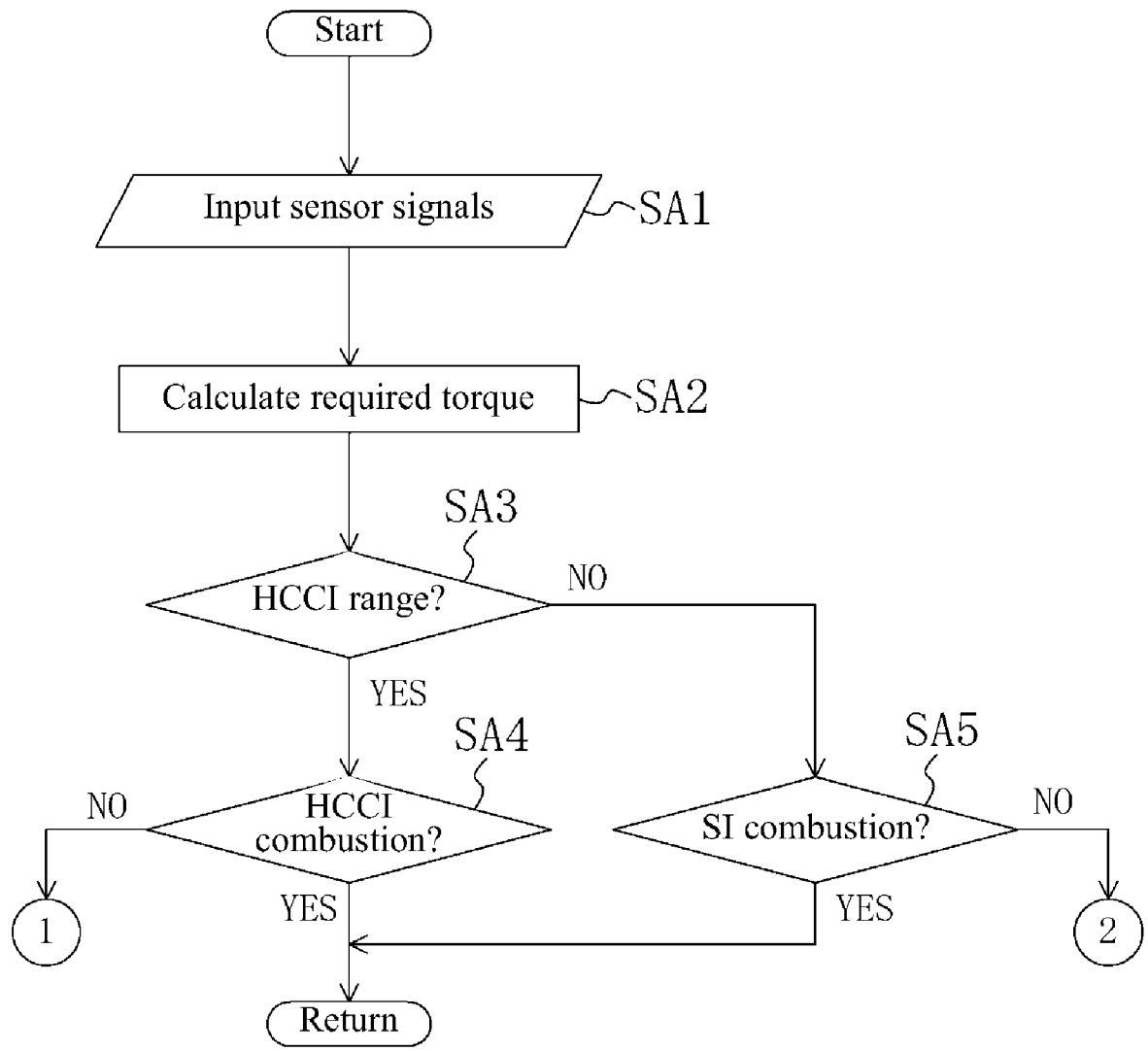
FIG. 12 is a flowchart showing a determination procedure for switching between the combustion modes.

Next, the specific procedure of the engine control will be described with reference to a flowchart in FIGS. 12-14. First, the flowchart in FIG. 12 shows a determination procedure for switching of HCCI combustion (i.e., auto-ignition mode) and SI combustion (i.e., spark-ignition mode). In Step SA1 after the start, signals from the crank angle sensor 8, airflow sensor 31, accelerator opening sensor 32, and speed sensor 33 are inputted to PCM 30. In Step SA2, PCM 30 then calculates a required torque (load) for the engine 1 and an engine speed. The engine speed may be directly calculated based on the signal from the crank angle sensor 8. The required torque may be directly calculated based on a traveling speed of the vehicle and an accelerator opening, for example, or based on the signal from the airflow sensor 31 and the engine speed while considering the amount of internal EGR gas.

In Step SA3, based on the calculated required torque and engine speed, PCM 30 determines whether the engine 1 is within the HCCI range (I) with reference to the control map in FIG. 10. If the determination is NO, PCM 30 proceeds to Step SA5 described later since it is considered to be within the SI ranges (II) and (III). On the other hand, if the determination is YES, PCM 30 proceeds to Step SA4, and PCM 30 then determines whether it is under HCCI combustion. If the determination is NO, PCM 30 proceeds to the flowchart in FIG. 13 since it is switching from SI combustion to HCCI combustion. On the other hand, if the determination is YES, PCM 30 continues the control for HCCI combustion.

Specifically, first, PCM 30 controls operation timings of the intake and exhaust valves 11 and 12 so that the negative overlapped period is produced by controlling VVL 14 and VVT 15. For example, PCM 30 may determine the overlapped amount of the intake and exhaust valves 11 and 12 to obtain the required amount of internal EGR gas based on the required torque and engine speed with reference to the empirical map, and may mainly control VVT 15 to achieve the overlapped amount.

In addition, VVL 14 may also be controlled so that the amount of lift determined based on the required torque and the engine speed with reference to the empirical map is achieved. The lifts of the intake and exhaust valves 11 and 12 in this map are empirically obtained and set beforehand so that a suitable air fuel ratio can be obtained corresponding to the amount of fuel supplied to the cylinder 2.

Thus, the negative overlapped period is provided for the operation of the intake and exhaust valves 11 and 12, and the temperature inside the cylinder 2 is increased by a large amount of internal EGR gas. Further, fuel is injected by the port injector 19 during the intake stroke, thereby forming substantially homogeneous lean air-fuel mixture inside the cylinder 2. Then, the fuel is caused to carry out auto ignition to burn without igniting the substantially homogeneous air-fuel mixture after the end of the compression stroke. Further, if it is in a lower engine load and lower engine speed condition, the fuel is injected by the direct injector 18 during the negative overlapped period to increase the ignitability of the substantially homogeneous air-fuel mixture.

On the other hand, in Step SA5 from the determination of NO in Step SA3, PCM 30 determines whether it is under SI combustion similar to Step SA4. If the determination is NO, and if it is switching from HCCI combustion to SI combustion, PCM 30 proceeds to the flowchart in FIG. 14. On the other hand, if the determination is YES, PCM 30 continues the control therefor since it is under SI combustion. That is, fuel is injected into the intake port 9 by port injector 19 from the compression stroke to the intake stroke of the cylinder 2, homogeneous air-fuel mixture of substantially stoichiometric air fuel ratio is formed inside the cylinder 2, and the air-fuel mixture is ignited by the spark plug 16.

[Switch to HCCI Combustion]

Next, the switching from SI combustion to HCCI combustion will be described. First, in Step SB1 of the flowchart in FIG. 13, PCM 30 controls VVL 14 and VVT 15 to obtain an operation timing of the intake and exhaust valves 11 and 12 suitable for HCCI combustion. That is, the operation timing of the intake valve 11 retards mainly by the operation of VVT 15, while the operation timing of the exhaust valve 12 advances, and the negative overlapped period becomes gradually larger, and the amount of internal EGR gas also increases.

Then, in Step SB2, PCM 30 determines whether to perform the stratified combustion based on the operating condition of the engine 1. In short, PCM 30 determines whether the transition is from the SI range (II) of higher load and higher engine speed to the HCCI range (I), or the transition is from the SI range (III) of lower engine load and lower engine speed. If it is under switching of combustion of higher load and higher engine speed, PCM 30 proceeds to Step SB7 as described later since the temperature inside the cylinder 2 is high, and the stratified combustion is not necessary to be performed (i.e., the determination is NO).

On the other hand, when it is under switching of combustion of lower engine load and lower engine speed, the temperature inside the cylinder 2 is also low. Therefore, during a period during which the internal EGR gas that gradually increases by the operation of VVT 15 is below a predetermined amount (for example, approximately 35-40% of the EGR rate), it is difficult to cause the substantially homogeneous air-fuel mixture to stably carry out the auto ignition. Thus, during this period, stabilized combustion may be attempted by performing the stratified combustion. That is, first, in Step SB3, PCM 30 determines an amount and timing of the third fuel injection during the compression stroke of the cylinder 2, and in Step SB4, if it reaches the injection timing, PCM 30 causes to perform the third fuel injection. Then, in Step SB5, PCM 30 causes the spark plug 16 to ignite the stratified air-fuel mixture to burn the stratified air-fuel mixture.

In this embodiment, the amount of the third fuel injection may also be determined based on the required torque and the engine speed with reference to the empirical map, for example. Further, the injection timing may also be set to a suitable timing within the second half of the compression stroke corresponding to the injection amount and the ignition timing, and may be determined based on the required torque and engine speed with reference to the empirical map.

Then, in Step SB6, PCM 30 determines whether the timing of switch to the SCCI combustion from the stratified combustion as described above is reached. If the determination is NO, PCM 30 returns to Step SB3 to continue the stratified combustion. On the other hand, if the amount of internal EGR gas gradually increases by the operation of VVT 15, and the amount of internal EGR gas exceeds the predetermined amount to be able to induce (or assist) the auto ignition of the substantially homogeneous air-fuel mixture by the spark ignition of the stratified air-fuel mixture (i.e., the determination is YES), PCM 30 proceeds to Step SB7, and switches to the following auto-ignition assist mode.

In this embodiment, the determination of whether the timing of the switch being reached may be performed based on a time lapsed after starting the control of VVL 14 and VVT 15 in Step SB1. Alternatively, the determination may be performed by counting the number of combustion cycles after starting the control of VVL 14 and VVT 15.

Then, in Step SB7 after the determination of the timing of the switch is reached (YES), PCM 30 reads three fuel injection amounts by the injectors 18 and 19 from the empirical injection amount map. The three fuel injection amounts includes the first injection amount by the direct injector 18 to form the active air-fuel mixture, the second injection amount by the port injector 19 to form the substantially homogeneous air-fuel mixture, and the third fuel injection amount by the direct injector 18 to form the stratified air-fuel mixture.

In this embodiment, the injection amount map also stores the optimum values of the first, second, and third fuel injection amounts corresponding to the required torque and the engine speed of the engine 1, that are empirically obtained, although the detailed explanation will be omitted, for example, it is preferable that the first and second injection amounts are increased according to an increase in the required torque, and the third fuel injection amount is the minimum amount required to form the stratified air-fuel mixture that can be ignited by a spark.

Further, in Step SB7, the first, second, and third fuel injection timings (i.e., target injection timings) are also read from the empirical injection timing map. For example, the timing of the first injection may be set so that the valve opening period of the direct injector 18 is within the negative overlapped period of the intake and exhaust valves 11 and 12, and the timing of the second injection may be set within a period from the middle of the intake stroke until the intake valve 11 opens. Further, the timing of the third fuel injection may be set at the end of the compression stroke.

In Step SB8, at the timings of the first, second, and third fuel injections determined in Step SB7, the direct injector 18 is operated at the timing of the first injection, the port injector 19 is operated at the timing of the second injection, and the direct injector 18 is operated again at the timing of the third fuel injection, respectively. Next, in Step SB9, PCM 30 actuates the ignition circuit 17 at a predetermined ignition timing in proximity to TDC (preferably, immediately after TDC), and supplies power to the spark plug 16 to ignite, and burns the cloud of the air-fuel mixture (i.e., stratified air-fuel mixture) formed in proximity to the spark plug 16 due to the third fuel injection.

Then, in Step SB10, PCM 30 determines whether the timing of the switch to HCCI combustion from SCCI combustion is reached. If the determination is NO, PCM 30 returns to Step SB7, and continues the operation in the auto-ignition assist mode. When the amount of internal EGR gas sufficiently increases, and the substantially homogeneous air-fuel mixture comes to stably carry out the auto ignition without the assist (i.e., the determination is YES), PCM 30 proceeds to Step SB11 to perform the control for HCCI combustion, and, then, returns to Step 1.

In this embodiment, similar to the determination in Step SB6, the determination of the switch timing to HCCI combustion may be performed based on the time lapsed after starting the control of VVL 14 and VVT 15 in Step SB1, or the number of combustion cycles. Preferably, the time lapsed or the number of combustion cycles, which serves as a determination criteria, may be set to shorter time or smaller number of combustion cycles for higher load or higher engine speed according to the operating condition of the engine 1 during the switching of combustion.

This setting is based on the idea that if the operating condition of the engine 1 is of higher engine load and higher engine speed, because the temperature inside the cylinder 2 is also high, the substantially homogeneous air-fuel mixture is easy to auto-ignite. Thus, stable HCCI combustion can be realized even when the amount of internal EGR gas is relatively small. Therefore, as a result, it is possible to shorten the period during which the transitional control for switching of the combustion is performed, and thereby minimizing the generation of nitrogen oxide accompany with the SCCI combustion or the stratified combustion during the transition.

As described above, upon the switching from SI combustion to HCCI combustion, when the amount of internal EGR gas is small during HCCI combustion, and the substantially homogeneous air-fuel mixture cannot stably auto-ignite, the auto ignition is transiently assisted by providing the spark ignition to the small cloud of the stratified air-fuel mixture. Further, when the auto ignition of the substantially homogeneous air-fuel mixture is difficult even when assisted by spark ignition to the small cloud of the stratified air-fuel mixture as described above, for the switching within the range of lower engine load and lower engine speed (for example, a transition from the operating range (C) to the operating range (III)), the stratified combustion is temporarily performed. That is, the third fuel injection is performed during the compression stroke of the cylinder 2, the stratified air-fuel mixture is generated in the combustion chamber, and the stratified air-fuel mixture is ignited by the spark plug and burns (In this case, there is substantially no auto ignition in the combustion chamber).

[Change to SI Combustion]

Next, the switching from HCCI combustion to SI combustion will be explained based on the flowchart in FIG. 14 with reference to the timing chart in FIG. 15. Fundamentally, this control procedure is contrary to the switching from SI combustion to HCCI combustion shown in FIG. 13 and, thus, a detailed explanation of the similar procedure will be omitted.

Figure 13:
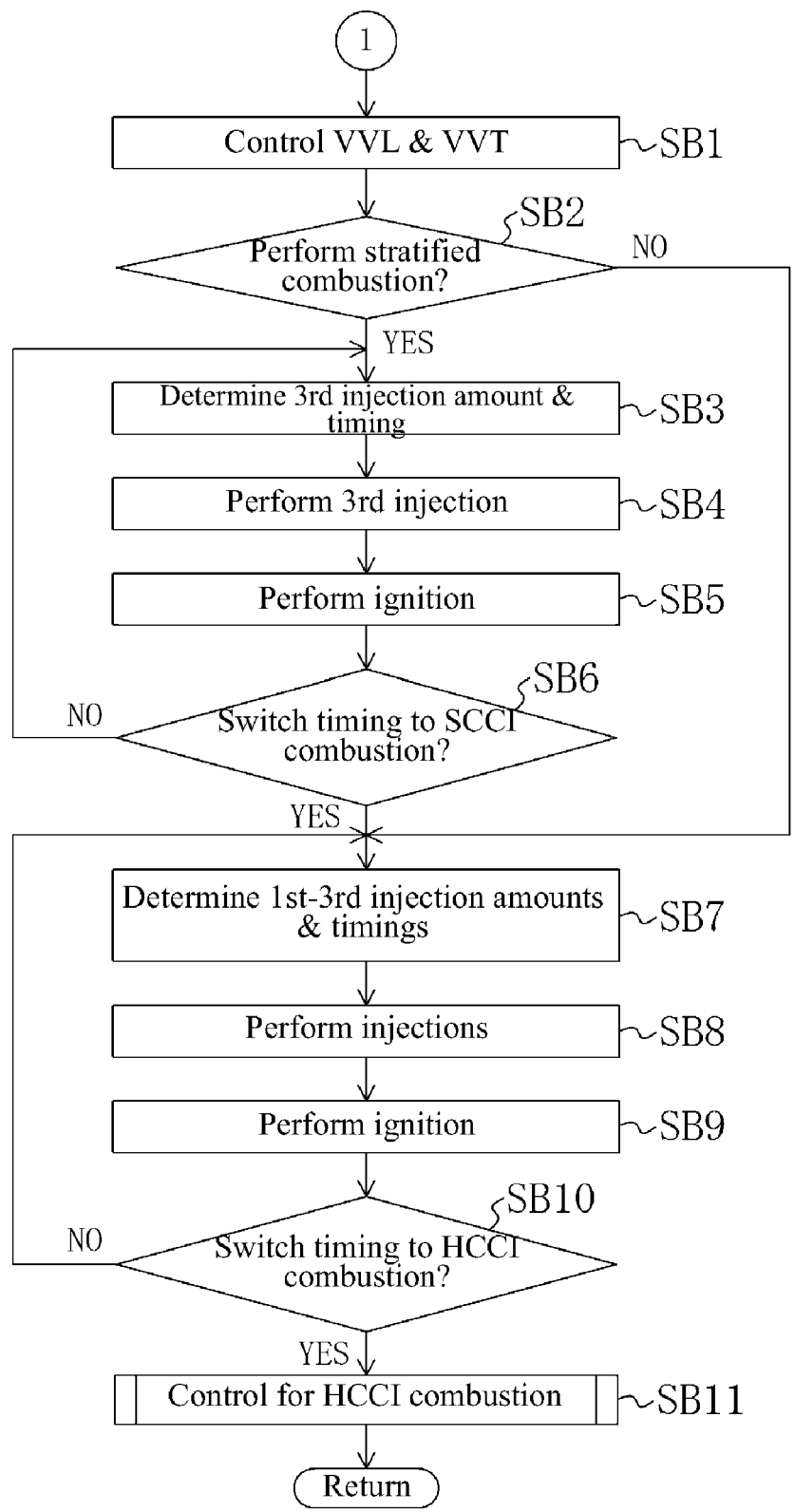
FIG. 13 is a subsequent flowchart of FIG. 12, showing a determination procedure during a transition of switching from SI combustion to HCCI combustion.
Figure 14:
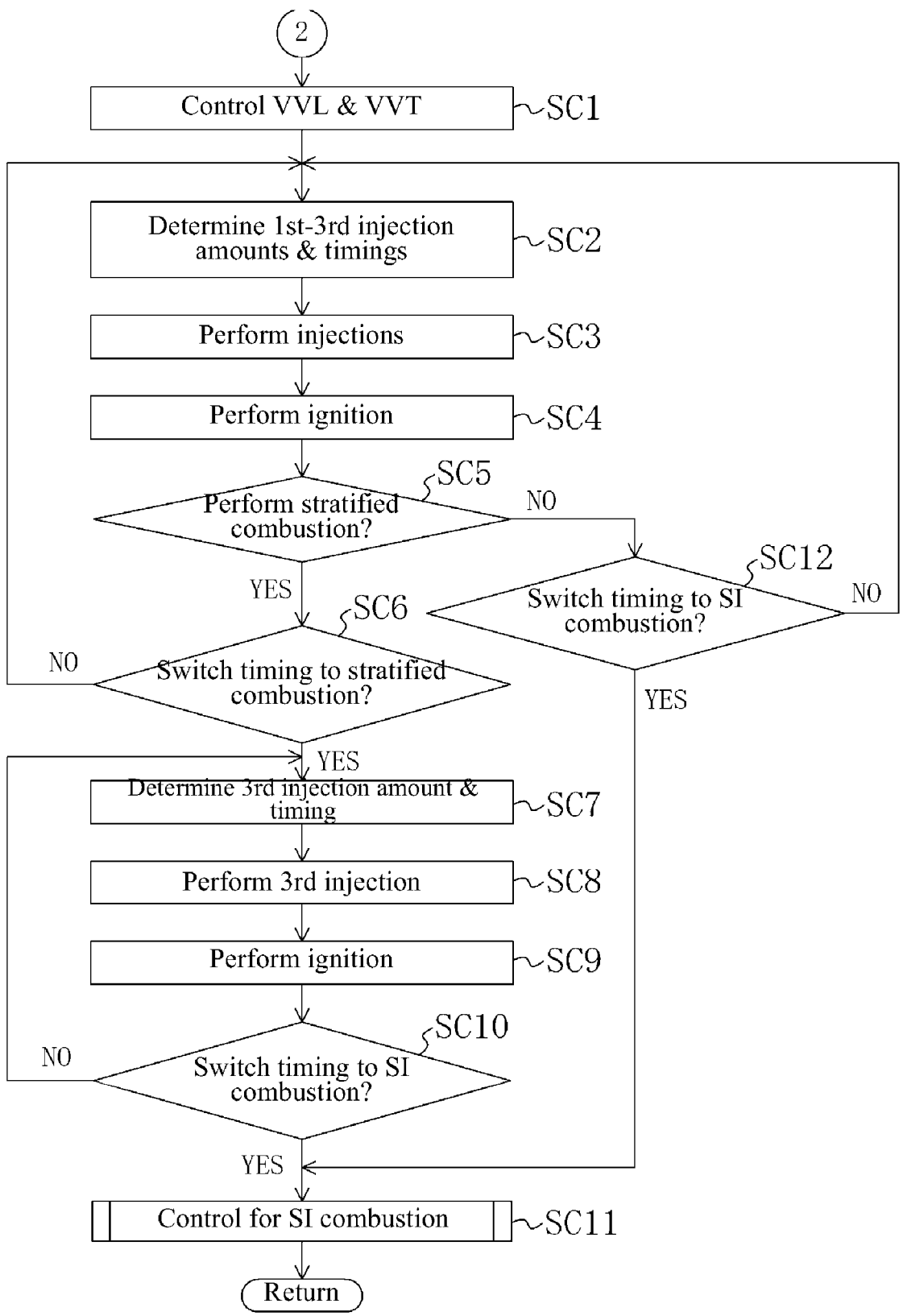
FIG. 14 is another subsequent flowchart of FIG. 12, showing a procedure during the transition of switching from HCCI combustion to SI combustion.

First, in Step SC1 of the flowchart in FIG. 14, PCM 30 mainly controls VVT 15 similar to Step SB1 of the flowchart of FIG. 13 to control the operation timing of the intake and exhaust valves 11 and 12 so as to obtain a suitable amount of internal EGR gas for SI combustion. Thus, as shown in (b) of FIG. 15, during a time period from the time t0 to time t2 the lift curve Lin of the intake valve 11 is shifted to the advance side, while the lift curve Lex of the exhaust valve 12 is shifted to the retard side, thereby the negative overlapped period becomes gradually smaller, and the amount of internal EGR gas gradually decreases as shown in (d) of FIG. 15 (this is represented by an EGR rate in this figure).

Corresponding to the reduction in the amount of internal EGR gas, in Steps SC2-SC4, PCM 30 operates the engine 1 in the auto-ignition assist mode as similar to the procedure of Steps SB7-SB9 of the flowchart in FIG. 13. Accordingly, as shown in (a) of FIG. 15, the combustion state becomes SCCI combustion. Upon this, in order to switch the air fuel ratio to the stoichiometric air fuel ratio (i.e., A/F=14.7) with consideration of exhaust emission (refer to (e) of FIG. 15), PCM 30 increases the amount of fuel injection (mainly, second injection amount) (refer to (f) of FIG. 15). Further, in order to reduce a variation of the torque accordingly, PCM 30 decreases the amount of lift of the intake valve 11 by the operation of VVL 14 (refer to (c) of FIG. 15).

Then, in Step SC5, PCM 30 determines whether the stratified combustion should be performed, similar to Step SB2 of the flowchart in FIG. 13. Then, if the switching of combustion is occurred in the engine operating range of higher engine load and higher engine speed, and it is not necessary to perform the stratified combustion (i.e., the determination is NO), PCM 30 proceeds to Step SC12 as described later. On the other hand, for example, if it is under the switching of combustion of lower engine load and lower engine speed such as transition from the operating range (III) to the operating range (C), and it is necessary to perform the stratified combustion (i.e., the determination is YES), PCM 30 proceeds to Step SC6.

In this Step SC6, PCM 30 determines whether the switch timing to the stratified combustion is reached similar to Step SB6 of the flowchart in FIG. 13. That is, as shown in (d) of FIG. 15, if the amount of internal EGR gas that gradually decreases is greater than a predetermined amount (shown with a black star in this figure), and the stable auto ignition of the substantially homogeneous air-fuel mixture is possible in case of being provided with the ignition spark assist (i.e., the determination is NO), PCM 30 returns to Step SC2 to continue SCCI combustion.

Figure 15:
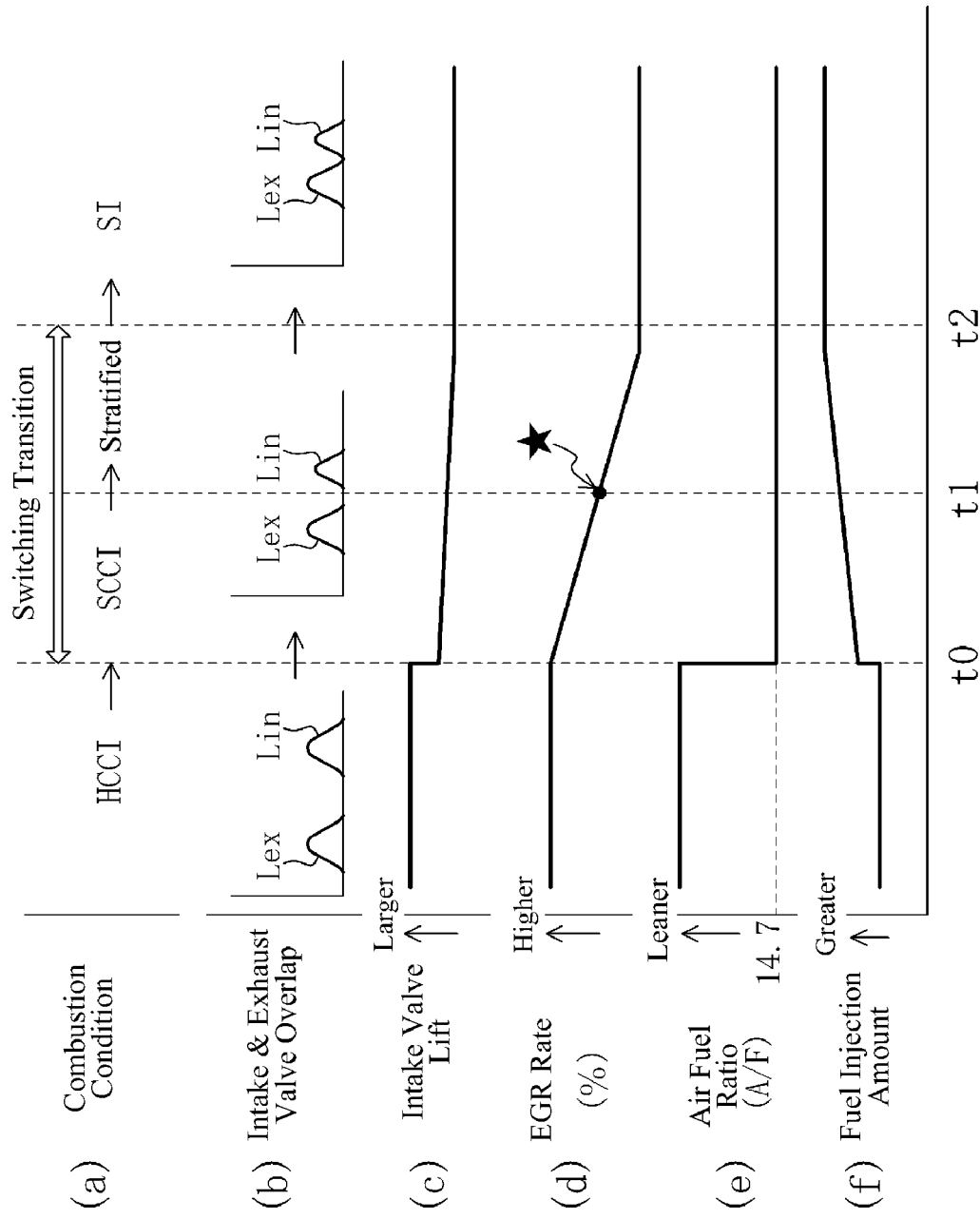
FIG. 15 is a timing chart showing changes in an air-intake and exhaust overlap, air-intake valve lift, EGR rate, air fuel ratio, and amount of fuel injection during the transition of switching from HCCI combustion to SI combustion.

On the other hand, if the amount of internal EGR gas further decreases to below the predetermined amount (the determination in Step SC6 at the time t1 in FIG. 15 is YES), PCM 30 proceeds to Steps SC7-SC9 since the stable auto ignition cannot be expected even if assisted by an ignition spark. Then, PCM 30 operates the engine 1 in the stratified combustion state, similar to Steps SB3-SB5 of the flowchart in FIG. 13. That is, the third fuel injection is performed during the compression stroke of the cylinder 2 to generate the stratified air-fuel mixture inside the combustion chamber, and the stratified air-fuel mixture is then ignited by the spark plug and burns (there is substantially no auto ignition in the combustion chamber).

Next, in Step SC10, PCM 30 determines whether the switch timing to SI combustion is reached similar to Step SB10 of the flowchart in FIG. 13. If the determination is NO, PCM 30 returns to Step SC7 to continue the stratified combustion. On the other hand, if the amount of internal EGR gas which gradually decreases as shown in (d) of FIG. 15 reaches to an appropriate amount (i.e., the determination is YES at the time t2), PCM 30 proceeds to Step SC11 to switch to the control for SI combustion, and then, returns to Step 1.

Further, in Step SC12 after the determination of NO in Step SC5 in which the stratified combustion is not performed, PCM 30 determines whether the switch timing to SI combustion is reached similar to Step SC10. If the determination is NO, PCM 30 returns to Step SC2 to continue SCCI combustion. On the other hand, if PCM 30 determines YES in Step SC12 with reduction of the amount of internal EGR gas, PCM 30 proceeds to Step SC11 to switch to the control for SI combustion, and then returns to Step 1.

Also upon the switching from SI combustion to HCCI combustion, it is preferable that the period during which the transitional control for the switching is performed is shortened as much as possible, as similar to the switching from HCCI combustion to SI combustion. For this purpose, for example, the amount of internal EGR gas upon the start of the transitional control of switching (that is, switching from HCCI combustion to SCCI combustion) may be set smaller for higher engine load or higher engine speed according to the operating condition of the engine 1 during the switching of combustion. Accordingly, for that case, the time lapsed until the termination of the transition control (that is, when switched to SI combustion) or the number of combustion cycles may be set less.

According to the entire flowchart in FIGS. 12 through 14, a switching transition control module is configured so that upon switching the auto-ignition mode and the spark-ignition mode, it provides the negative overlapped period of the intake and exhaust valves 11 and 12, causes the port injector 19 to inject fuel during the intake stroke to form substantially homogeneous lean air-fuel mixture inside the cylinder 2, then, causes the direct injector 18 to inject fuel during the compression stroke to form the stratified air-fuel mixture around the spark plug 16, and causes the ignition of the stratified air-fuel mixture by inducing the auto ignition of the stratified air-fuel mixture, and thereby burns the substantially homogeneous lean air-fuel mixture.

The switching transition control module of this embodiment causes the direct injector 18 to inject fuel (first injection) during the negative overlapped period of the intake and exhaust valves 11 and 12 to enhance ignitability of the substantially homogeneous air-fuel mixture.

Further, during the engine 1 shifting between the HCCI range (I) and the SI range (III) of lower engine load and lower engine speed, when in a state in which the amount of internal EGR gas becomes transiently below the predetermined amount, and stable auto ignition cannot be expected even if assisted with spark, the switching transition control module of this embodiment may secure the combustion stability by operating the engine 1 in the stratified combustion state.

The control of the flowchart of FIGS. 12-14 can be realized by execution of the control program electronically stored in the memory of PCM 30. In this sense, it can be said that PCM 30 itself constitutes the switching transition control module.

Therefore, according to the engine control device A of this embodiment, during switching the operating mode between the auto-ignition mode and the spark-ignition mode in accordance with the change in the operating condition of the engine 1, even when the amount of internal EGR gas inside the cylinder 2 becomes transiently insufficient for HCCI combustion but too great for SI combustion, the engine control device injects fuel into the high-temperature internal EGR gas to form the active air-fuel mixture, and to form the stratified air-fuel mixture around the spark plug 16, then the stratified air-fuel mixture is ignited to combust, and thereby achieving the auto-ignition assist mode (i.e., SCCI combustion) in which the auto ignition of the substantially homogeneous air-fuel mixture is induced (assisted), thereby preventing the unstable combustion.

In the auto-ignition assist mode, the torque required for maintaining the operating condition of the engine 1 can be obtained mainly by the auto-ignited combustion of the substantially homogeneous air-fuel mixture. Further, the amount of fuel injection for the assist of the auto ignition is set to the minimum amount required to form the stratified air-fuel mixture that can be ignited by a spark. Thus, the amount of nitrogen oxide generated by the combustion of fuel can be decreased by a great amount, and aggravation of the exhaust emission during the transition of switching can fully be controlled.

Further, by shortening the period during which the control for the switching transition is performed for higher engine load or higher engine speed according to the operating condition of the engine 1, generation of nitrogen oxide by the combustion during the transition can also be minimized.

On the other hand, during the operating condition of lower engine load or lower engine speed, upon switching, the combustion stability may not be transiently secured even in the auto-ignition assist mode. However, for this case, the combustion stability may be secured by performing so-called stratified combustion.

Other Embodiments

The configuration of the invention includes the other various configurations, without being limited to the embodiment described above. That is, in the previous embodiment, in SCCI combustion upon the switch of HCCI combustion and SI combustion, the direct injector 18 performs the first injection to form the active air-fuel mixture. However, the first injection may not be necessary depending on the fuel property.

Further, in the previous embodiment, the second injection is performed during the intake stroke to form the substantially homogeneous air-fuel mixture. However, the second injection may be performed during the exhaust stroke, or the expansion stroke and the compression stroke before the exhaust stroke, because this is performed by the port injector 19.

Alternatively, the first, second, and third fuel injections may be performed only by the direct injector 18, without providing the port injector 19 to the engine 1. However, it may be difficult to perform both the second and third fuel injections by single injector, because a smaller amount of the third fuel injection is preferable from a viewpoint of controlling generation of nitrogen oxide, and a considerably greater amount of the second injection is required with consideration of the maximum output of the engine 1. Therefore, it is preferable to use two injectors 18 and 19 of different flow characteristics similar to those in the previous embodiment.

Further, in the previous embodiment, the lift characteristics of the intake and exhaust valves 11 and 12 are continuously changed by the operation of VVL 14 and VVT 15. However, without being limited to this, either of the lift amount or the phase angle may be switched stepwise. Further, a valve operating mechanism for causing an electromagnetic actuator to open and close the intake and exhaust valves 11 and 12 individually may also be utilized.

Further, the auto ignition (i.e., SCCI combustion) by the ignition assistance to be performed upon the switching (shifting) of the control mode between HCCI combustion and SI combustion may be performed only in a range of lower engine load or lower engine speed. That is, SCCI combustion may be performed only during the transition between the operating range (III) and the operating range (C). If the formation and combustion by ignition of the stratified air-fuel mixture to be performed in SCCI combustion are not performed in the range of higher engine load or higher engine speed, generation of nitrogen oxide due to the spark-ignited combustion can be avoided.

As described above, the invention is advantageous for a gasoline engine that is configured so that HCCI combustion and SI combustion are switched, is able to secure the combustion stability during the switching transition, and control aggravation of the exhaust emission.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of operating an internal combustion engine having a combustion chamber with a piston and a spark plug, comprising:

during a first mode, bringing the temperature of the combustion chamber to auto-ignition temperature by adjusting engine operating conditions and producing auto-ignition in said combustion chamber without requiring spark from said spark plug; and during a second mode, bringing the temperature of the combustion chamber close to auto-ignition temperature by adjusting engine operating conditions, forming a small cloud of stratified air-fuel mixture near said spark plug, igniting said small cloud of stratified air-fuel mixture by a spark from said spark plug, and then causing cylinder pressure to rise, thereby producing auto-ignition at other sites in said combustion chamber;

wherein said first mode is implemented in a first operating range and said second mode is implemented only in a second operating range where at least one of engine speed and load is lower than a respective one of engine speed and load in said first operating range, the method further comprising producing substantially homogenous air-fuel mixture at said other sites in said combustion chamber by providing fuel into said combustion chamber in at least an intake stroke of said piston, and wherein said small cloud of stratified air-fuel mixture is formed by providing fuel into said combustion chamber in at least a compression stroke of said piston, wherein said providing fuel into said combustion chamber in at least a compression stroke includes providing a specific amount of fuel into said combustion chamber during said compression stroke, which is independent from said engine load.

2. The method as described in claim 1, wherein said adjusting engine operating conditions comprises adjusting at least intake and exhaust valve timing of said engine.

3. The method as described in claim 2, wherein said adjusting at least intake and exhaust valve timing of said engine includes providing a negative overlap period wherein both of an intake and an exhaust valve are closed to increase temperature inside of said combustion chamber by using burned gas kept in said combustion chamber.

4. The method as described in claim 3, further comprising producing active air-fuel mixture having high ignition performance by injecting fuel directly into said combustion chamber in said negative overlap period.

5. The method as described in claim 4, wherein said engine comprises a first injector capable of injecting fuel into said combustion chamber directly and a second injector capable of injecting fuel into a intake air passage of said engine, and wherein said active air-fuel mixture is produced by injecting fuel directly into said combustion chamber with said first injector in said negative overlap period, said substantially homogenous air-fuel mixture is produced in said combustion chamber by injecting fuel with said second injector in said intake stroke and said small cloud of stratified air-fuel mixture is formed near said spark plug by injecting fuel directly near said spark plug with said first injector in said compression stroke.

6. The method as described in claim 1, further comprising a third mode where substantially homogenous air-fuel mixture having substantially stoichiometric air fuel ratio is produced in said combustion chamber and said spark plug ignites said substantially homogenous air-fuel mixture, wherein said third mode is implemented in a third operating range where engine speed and load are lower than said second operating range.

7. The method as described in claim 6, further comprising:
for a predetermined time period in transition between said second mode and said third mode, producing only stratified air-fuel mixture in said combustion chamber by providing fuel into said combustion chamber directly in compression stroke and igniting said stratified air-fuel mixture by said spark plug.

8. A method of operating an internal combustion engine having a combustion chamber with a piston and a spark plug, comprising:
during a first mode, bringing the temperature of the combustion chamber to auto-ignition temperature by adjusting engine operating conditions and producing auto-ignition in said combustion chamber with no spark from said spark plug;
during a second mode, bringing the temperature of the combustion chamber close to auto-ignition temperature by adjusting engine operating conditions, forming a small cloud of stratified air-fuel mixture near said spark plug by providing fuel into the combustion chamber in at least a compression stroke of said piston that includes a specific amount of fuel provided into said combustion chamber during said compression stroke, which is independent of at least one of engine speed and load, igniting said small cloud of stratified air-fuel mixture by a spark from said spark plug, and then causing cylinder pressure to rise, thereby producing auto-ignition at other sites in said combustion chamber; and
during a third mode, producing substantially homogenous air-fuel mixture having substantially stoichiometric air fuel ratio in said combustion chamber and igniting said substantially homogenous air-fuel mixture by a spark from said spark plug;
wherein said first mode is implemented in a first operating range, said second mode is implemented only in a second operating range where at least one of engine speed and load is lower than a respective one of engine speed and load in said first operating range and said third mode is implemented in a third operating range where engine speed and load are lower than a respective one of engine speed and load in said second operating range; and
wherein, for a predetermined time period in transition between said second mode and said third mode, only stratified air-fuel mixture is produced in said combustion chamber by providing fuel into said combustion chamber directly in a compression stroke and said stratified air-fuel mixture is ignited by a spark from said spark plug.

9. An engine operating system for operating an internal combustion engine having a combustion chamber with a piston and a spark plug, comprising:
a speed sensor for detecting a value related to engine speed;
an engine load sensor for detecting a value related to engine load;
an actuator for driving at least one engine component except for said spark plug, capable of adjusting the temperature inside of said combustion chamber; and
a controller configured to:
communicate with said speed sensor and said engine load sensor;
receive signals related to engine speed and signals related to engine load from said sensors;
when said engine is in a first operating range, control said actuators so that the temperature of said combustion chamber reaches an auto-ignition temperature and auto-ignition in said combustion chamber is produced without requiring spark from said spark plug; and
only when said engine is in a second operating range where at least one of engine speed and load is lower than a respective one of engine speed and load in said first operating range, control said actuators so that the temperature of said combustion chamber approaches the auto-ignition temperature, control a fuel injector so that a small cloud of stratified air-fuel mixture is formed near said spark plug, and control said spark plug so that said small cloud of stratified air-fuel mixture is ignited and then cylinder pressure is raised, thereby producing the auto-ignition at other sites in said combustion chamber, said controller being further configured to control said actuators to provide fuel into said combustion chamber in at least an intake stroke of said piston so that substantially homogenous air-fuel mixture at said other sites in said combustion chamber is produced and to provide a specific amount of fuel into said combustion chamber in at least a compression stroke of said piston so that said small cloud of stratified air-fuel mixture is formed by providing fuel into said combustion chamber in at least a compression stroke of said piston, said specific amount of fuel provided into said combustion chamber during said compression stroke being independent from said engine load.

10. The system as described in claim 9, wherein said engine components comprise an intake valve and an exhaust valve of said engine; and wherein said controller is configured to operate at least one of each actuators provided for at least one of said intake and exhaust valve so that there is a negative overlap period wherein both of said intake and exhaust valve are closed in at least part of the exhaust stroke of said piston and at least part of the intake stroke of said piston to increase temperature inside of said combustion chamber by using burned gas kept in said combustion chamber.

11. The system as described in claim 10, wherein, when said engine is in said second operating range, said controller is configured to operate a first fuel injector so that substantially homogenous air-fuel mixture is produced in said combustion chamber by providing fuel at least in said intake stroke and then to operate a second injector so that said small cloud of stratified air-fuel mixture is produced near said spark plug by providing fuel in said compression stroke.

12. The system as described in claim 11, wherein said controller is configured to operate said spark plug so that a spark from said spark plug ignites said small cloud of stratified air-fuel mixture such that said auto-ignition of said substantially homogenous air-fuel mixture is produced at a predetermined timing near the top dead center of said compression stroke.

13. The system as described in claim 11, wherein said controller is configured to operate said second injector so that a specific amount of fuel is provided to said combustion chamber, which is independent from the engine load, to produce said small cloud of stratified air-fuel mixture.

14. The system as described in claim 11, wherein said controller is configured to operate said second injector so that an active air-fuel mixture having high ignition performance is produced in said combustion chamber by injecting fuel into said combustion chamber in said negative overlap period.

15. The system as described in claim 11, wherein said first injector is provided so that said first injector can inject fuel into an intake passage and said second injector is provided so that said second injector can inject fuel directly into said combustion chamber.

16. The system as described in claim 9, wherein said controller is further configured to control a fuel injector in a third operating range where engine speed and load are lower than said second operating range so that a substantially homogenous air-fuel mixture having substantially stoichiometric air fuel ratio is produced in said combustion chamber, and then control said spark plug so that said substantially homogenous air-fuel mixture combusts.

17. The system as described in claim 16, wherein said controller is further configured to control said fuel injector for a predetermined time period in engine condition transition between said second operating range and said third operating range so that only stratified air-fuel mixture is produced in said combustion chamber by providing fuel into said combustion chamber directly in compression stroke and then control said spark plug so that said stratified air-fuel mixture combusts.

* * * * *